(12) United States Patent
Yamamichi et al.

(10) Patent No.: US 7,394,902 B2
(45) Date of Patent: Jul. 1, 2008

(54) ENCRYPTION APPARATUS, DECRYPTION APPARATUS AND ENCRYPTION SYSTEM

(75) Inventors: Masato Yamamichi, Kadoma (JP); Yuichi Futa, Osaka (JP); Motoji Ohmori, Hirakata (JP); Makoto Tatebayashi, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 752 days.

(21) Appl. No.: 10/680,294

(22) Filed: Oct. 8, 2003

(65) Prior Publication Data

US 2004/0071293 A1 Apr. 15, 2004

(30) Foreign Application Priority Data

Oct. 9, 2002 (JP) ............................ 2002-296219

(51) Int. Cl.
*H04L 9/00* (2006.01)
*H04L 9/32* (2006.01)

(52) U.S. Cl. ........................... 380/277; 380/30; 380/46; 713/193

(58) Field of Classification Search ............ None
See application file for complete search history.

(56) References Cited

U.S. PATENT DOCUMENTS

| | | | | |
|---|---|---|---|---|
| 5,848,154 | A * | 12/1998 | Nishio et al. | 705/51 |
| 6,104,810 | A * | 8/2000 | DeBellis et al. | 380/43 |
| 7,031,468 | B2 * | 4/2006 | Hoffstein et al. | 380/28 |
| 2002/0165912 | A1 * | 11/2002 | Wenocur et al. | 709/203 |
| 2003/0021421 | A1 * | 1/2003 | Yokota et al. | 380/277 |
| 2003/0059045 | A1 * | 3/2003 | Ruehle | 380/46 |
| 2003/0061483 | A1 * | 3/2003 | Schell et al. | 713/166 |

FOREIGN PATENT DOCUMENTS

WO WO 2001/93013 A1 * 6/2001

OTHER PUBLICATIONS

Whyte, William, "Analysis of NTRUEncrypt Paddings, Strong security that fits everywhere," NTRU, Aug. 2002.*
Warwick Ford and Michael S. Baum, entitled "*Secure Electronic Commerce, Building the Infrastructure for Digital Signatures and Encryption*", (second edition) 6.5-6.6 (p. 198-226) Prentice Hall PTR, 2001.
Digital Transmission Content Protection Specification Revision 1.2 (Informational Version), Jul. 11, 2001.
Digital Transmission Content Protection Specification Revision 1.2a (Information Version) Feb. 25, 2002.

(Continued)

*Primary Examiner*—Gilberto Barron, Jr.
*Assistant Examiner*—Laurel Lashley
(74) *Attorney, Agent, or Firm*—Wenderoth, Lind & Ponack, L.L.P.

(57) ABSTRACT

The present invention pertains to a transmission apparatus for generating an encrypted text by encrypting a plaintext, which includes a parameter storage unit for storing a random parameter (the number of terms whose coefficients indicate 1) adapted to an encryption key and an encryption apparatus and a decryption apparatus; an encryption unit for generating, from the plaintext, the encrypted text using the encryption key and the random parameter stored in the parameter storage unit, complying with an encryption algorithm based on the NTRU™ method; and a key updating unit for updating the random parameter stored in the parameter storage unit and the encryption key, as time passes.

26 Claims, 21 Drawing Sheets

OTHER PUBLICATIONS

Hoffstein, J. et al., entitled "*NTRU: A Ring-Based Public Key Cryptosystem*", Algorithmic Number Theory, International Symposium, XX, XX, Jun. 21, 1998, pp. 267-288.

Goldwasser, S., entitled "*Eliminating Decryption Errors in the AJTAI-DWORK Cryptosystem*", Advances in Cryptology—Crypto '97. Santa Barbara, Aug. 17-21, 1997, Proceedings of the Annual International Cryptology Conference (CRYPTO), Berlin, Springer, DE, vol. CONF. 17, Aug. 17, 1997, pp. 105-111.

\* cited by examiner

Fig. 11

| Random parameter d | 18 | 28 | 38 | 48 | 58 | 68 | 78 |
|---|---|---|---|---|---|---|---|
| Probability of decryption error(%) | 0.0007 | 0.09 | 2.6 | 2.3 | 7.1 | 13.7 | 24.8 |

ENCRYPTION APPARATUS, DECRYPTION APPARATUS AND ENCRYPTION SYSTEM

TECHNICAL FIELD

The present invention relates to an encryption system, especially to an encryption system using encryption algorithms based on an NTRU™ encryption method.

BACKGROUND ART

Encrypted communication using a public key encryption is one of a plurality of methods utilized to realize confidential communications between a transmission apparatus and a receiving apparatus. In the public key cryptosystem, the transmission apparatus encrypts the contents of the communications using a public key possessed by the receiving apparatus and transmits it to the receiving apparatus, and the receiving apparatus then receives the encrypted contents and obtains the original contents by decrypting it with the use of its own private key. This method is published in detail, for example, in *Modern Cryptography*. Mathematics in Information Science. Ser. Tatsuaki Okamoto, and Hirosuke Yamamoto, Sangyo Tosyo, 1997.

Under the common encryption system using this method, plural transmission apparatuses and receiving apparatuses exist. The transmission apparatus firstly acquires a public key possessed by the destination receiving apparatus. The public key makes a pair with the private key possessed by the destination receiving apparatus and is released in the encryption system. Then, the transmission apparatus encrypts and transmits the data to be communicated using the public key obtained as above whereas the receiving apparatus receives the telecommunication data encrypted by the transmission apparatus, decrypts the data using its own private key and obtains the original data.

Here, if the private key possessed by the destination receiving apparatus is disclosed, the encryption system is not secure any more because the contents of communications encrypted using the public key possessed by the destination receiving apparatus can be decrypted by an outsider who has the disclosed private key. Therefore, it is required that the private key possessed by the receiving apparatus be placed under strict control so that it is not leaked to outsiders.

However, there is a possibility that the private key could be disclosed by an accident of some sort. It is necessary, therefore, to stop the usage of the public key paired with the disclosed private key in the case in which the private key possessed by the receiving apparatus is disclosed or any such doubt arises.

As an example of such a method, a method to stop the usage of the public key paired with the disclosed private key, using a data structure called Certificate Revocation List (CRL), when the private key possessed by the receiving apparatus is disclosed, is suggested. This method is published, for example, in *Digital Signature and Cryptographic Technology*. Shinichiro Yamada. Trans. Pearson Education Inc., 1997: pp. 159-214.

As another example, a method to use SRM (System Renewability Messages) is suggested in DTCP (Digital Transmission Content Protection Messages) for protecting the digital contents transmitted on a serial bus complying with the IEEE (Institute of Electrical and Electronics Engineers) 1394 Standard. With the use of the SRM, it is possible to stop the usage of the public key possessed by the receiving apparatus when the private key possessed by the receiving apparatus is disclosed. This method is published, for example, in "Digital Transmission Content Protection Specification Revision 1.2 (Informational Version) Jul. 11, 2002.

The following describes these methods briefly.

The public key is associated with identification information to identify a person or an object that possesses it and is converted into a format to which a serial number or the like is attached by a reliable third party. Moreover, the digital signature of the third party is attached to the public key in order to prevent falsification attempted by others. This digital signature is called a public key certificate. In the CRL and the SRM issued by the third party, the serial number of the public key certificate of the public key whose usage has to be stopped for the reason such as the disclosure of the private key or the like is described. Therefore, it is possible to stop the usage of the public key paired with the disclosed private key by examining the serial number described in the CRL and the SRM.

Here, the application of this method to the encryption system for encrypted communications between the transmission apparatus and the receiving apparatus is considered. The transmission apparatus confirms the digital signature for the public key certificate of the destination receiving apparatus, obtains the public key and the serial number based on the public key certificate and also acquires the CRL and the SRM issued by the third party. The transmission apparatus then stops the usage of the public key when the serial number of the obtained public key certificate is contained in the CRL and the SRM. Thus, the usage of the public key paired with the disclosed private key is ceased when the private key possessed by the receiving apparatus is disclosed. Consequently, safe encrypted communications can be realized between the transmission apparatus and the receiving apparatus.

However, the method using the CRL and the SRM described above contains the following problems.

(1) Even though the private key possessed by the receiving apparatus is disclosed, the transmission apparatus cannot always stop the usage of the public key possessed by the receiving apparatus when the updated CRL and SRM cannot be obtained. Therefore, with the conventional art, there is a risk that the content of the encrypted communications transmitted by the transmission apparatus continues to be decrypted by the receiving apparatus operated by an outsider having the disclosed private key. Namely, there is a risk that the disadvantage on the sender's side cannot be prevented when the private key is disclosed in a case of transmitting digital works such as music.

(2) It is desirable to regularly renew the key in order to assure the security for the encrypted communications. However, with the conventional art, it is difficult to urge the user operating the receiving apparatus to update the key since the receiving apparatus functions normally without the regular updating of the key.

(3) The CRL and the SRM issued by the reliable third party is required.

The following describes in detail the problems (1), (2) and (3), mentioned above.

Firstly, with the method using the CRL and the SRM, there is a case in which the usage of the public key possessed by the receiving apparatus cannot be stopped even if the private key possessed by the receiving apparatus is disclosed, since the transmission apparatus cannot obtain the updated CRL and SRM. For example, a system in which digitalized movie content data is recorded on a storage medium such as a DVD (Digital Versatile Disc) is considered here. The movie content data is encrypted with an encryption key possessed by each player, namely, a receiving apparatus, and is recorded onto a disk. The player, having a decryption key corresponding to the encryption key, decrypts the encrypted movie content data recorded on the disk and replays the movie. A certain player is an unauthenticated apparatus aiming to prevent the replay operated by the player and the CRL or the SRM in which the player's public key is described are recorded on the storage medium like DVD and then issued.

Assume that it is proved that the private key of the receiving apparatus is disclosed. From now on, the updated CRL and SRM in which the serial number of the public key certificate of the receiving apparatus is additionally described are recorded on the DVD and then issued. However, on the DVD distributed before, only the old versions of the CRL and the SRM are recorded and thereby the serial numbers of the latest public key certificates are not recorded. Consequently, the transmission apparatus cannot necessarily stop the usage of the public key used by the unauthenticated receiving apparatus since the former can obtain only the old versions of the CRL and the SRM as far as it uses the DVD with old information.

Also, in the DTCP standard using the SRM, the old version of SRM possessed by the apparatus is updated to the new version possessed by other apparatuses between the apparatuses connected via the IEEE 1394 serial bus. Namely, due to this system, a new version of the SRM can be obtained not only from the storage medium like DVD but also from other apparatuses. This system, however, does not assure completely in obtaining the latest version of the SRM. Thus, the transmission apparatus cannot necessarily stop the usage of the public key possessed by the receiving apparatus. Therefore, the content of the encrypted communications transmitted by the transmission apparatus risk being decrypted continuously by the outsider having the disclosed private key. Namely, there is a risk that the disadvantage on the sender's side cannot be prevented when the private key is disclosed in a case of transmitting digital works such as music.

Secondly, with the method using the CRL and the SRM, it is hard to urge a person operating the receiving apparatus to update its own public key or private key. This attributes to the fact that the receiving apparatus can continue to decrypt the encrypted communications completely until the transmission apparatus stops using the public key possessed by the receiving apparatus, using the CRL and the SRM.

With the conventional art, it has been required to obtain the latest version of the CRL and the SRM from the third party for stopping the usage of the public key paired with the disclosed private key and check the serial numbers described in the CRL and the SRM. However, in general, there are many cases in which a person operating the transmission apparatus performs encrypted communications either without the knowledge to check the CRL and the SRM or ignoring the checking since it is a hassle to obtain the latest versions of the CRL and the SRM from the server. This is because both of the transmission apparatus and the receiving apparatus operate normally without regular updating of the key and perform encrypted communications without checking through the CRL and the SRM, when the transmission apparatus obtains the public key used by the receiving apparatus. When the transmission apparatus performs encrypted communications without checking the CRL and the SRM, the person operating the receiving apparatus will not update its own public key/ private key since the receiving apparatus operates normally without regularly updating the key. It is also conceivable to use a method to set an effective period for the public key certificate so that the transmission apparatus stops the usage of the public key whose effective period is not valid and the transmission apparatus does not perform encrypted communications towards the receiving apparatus as long as the receiving apparatus does not update the key. However, in this case, there are many cases in which the person operating the transmission apparatus performs encrypted communications either without knowing the checking of the effective period or ignoring the checking as is the case of the method using the CRL and the SRM. As a result, the person operating the receiving apparatus will not update regularly its own public key/private key since the receiving apparatus operates normally without the regular updating of the key.

Lastly, with the method using the CRL and the SRM, it is presupposed that the CRL and the SRM are issued by the reliable third party. The problem is that the presence of such CRL and SRM has to be presumed.

SUMMARY OF THE INVENTION

The present invention has been conceived in view of the aforementioned circumstances and the first object is to provide an encryption apparatus, a decryption apparatus and an encryption system that prevent the contents of encrypted communications performed by the transmission apparatus from being continuously decrypted by an outsider having a disclosed private key.

The second object is to provide an encryption apparatus, a decryption apparatus and an encryption system that prevent a disadvantage on the sender's side when the private key is disclosed in the case of transmitting digital works such as music.

The third object is to provide an encryption apparatus, a decryption apparatus and an encryption system that urge the person operating a receiving apparatus or a transmission apparatus to update the keys respectively.

The fourth object is to provide an encryption apparatus, a decryption apparatus and an encryption system that do not require the CRL and the SRM issued by a third party when the transmission apparatus performs encrypted communications.

The encryption apparatus according to the present invention for generating an encrypted text by encrypting a plaintext comprises: a storage unit operable to store an encryption key and a parameter which is adapted to a decryption apparatus and changes a probability of decryption error in decrypting the encrypted text; an encryption unit operable to generate the encrypted text from the plaintext, using the encryption key and the parameter stored in the storage unit, according to an encryption algorithm which changes the probability of the decryption error in decrypting the encrypted text depending on a value of the parameter; and an updating unit operable to update the parameter stored in the storage unit. It is preferable that the updating unit updates the parameter stored in the storage unit, as time goes by.

Therefore, it is possible to prevent the decryption apparatus from encrypting the encrypted text correctly by updating the parameter as time passes. Thus, the receiving apparatus operated by the outside with the intention to use the disclosed private key (decryption key) maliciously cannot decrypt the content of the encrypted communication transmitted by the transmission apparatus. Consequently, when the private key is disclosed, the continuous decryption of the detail of the encrypted communications by the receiving apparatus operated by the outsider having the disclosed key can be prevented. This, for instance, allows the prevention of the disadvantage on the side of the sender's when the private key is disclosed in the case of transmitting digital works such as music.

Also, the probability that the receiving apparatus operated by a normal user fails to decrypt the content of the encrypted communications increases as the decryption is performed.

Moreover, the transmission apparatus does not require the CRL and the SRM issued by the third party, when performing the encrypted communications.

The decryption apparatus according to another aspect of the present invention for decrypting an encrypted text comprises: a decryption unit operable to generate a decrypted text using a decryption key, from the encrypted text generated according to an encryption algorithm which changes a probability of decryption error in decrypting the encrypted text depending on a value of a parameter; a judgment unit operable to judge whether or not the decrypted text is obtained correctly; a decryption key updating request unit operable to request an encryption apparatus to update the decryption key, according to a result of the judgment made by the judgment unit; and a parameter initialization request unit operable to request the encryption apparatus to change the value of the parameter to an initial value which decreases the probability of the decryption error in decrypting the encrypted text to a degree that engenders no practical problems.

Thus, the decryption key is updated when the decrypted text cannot be obtained correctly. Thus, it is possible to urge the receiving apparatus or the user operating the receiving apparatus to update the key.

The encryption system according to another aspect of the present invention comprises an encryption apparatus for generating an encrypted text by encrypting a plaintext and a decryption apparatus for generating a decrypted text by decrypting the encrypted text.

The encryption apparatus includes: a storage unit operable to store an encryption key and a parameter which is adapted to a use in the decryption apparatus and changes a probability of decryption error in decrypting the encrypted text; an encryption unit operable to generate the encrypted text from the plaintext, using the encryption key and the parameter stored in the storage unit, according to an encryption algorithm which changes the probability of the decryption error in decrypting the encrypted text depending on a value of the parameter; and an updating unit operable to update the parameter stored in the storage unit.

The decryption apparatus includes: a decryption unit operable to generate a decrypted text from the encrypted text using a decryption key; a decryption key updating request unit operable to request the encryption apparatus to update the decryption key; and a parameter initialization request unit operable to request the encryption apparatus to change the value of the parameter to an initial value which decreases the probability of decryption error to a value less than or equal to a predetermined value.

Preferably, the encryption apparatus further includes: a key updating unit operable to receive the request to update the decryption key from the decryption key updating request unit and update the encryption key and the decryption key in response to the updating request; and a parameter initialization unit operable to receive the request to initialize the random parameter from the parameter initialization request unit, respond to the initialization request and set the random parameter to the initial value which decreases the probability of decryption error to the value less than or equal to the predetermined value. Also, the decryption key updating request unit and the parameter initialization request unit send respectively, to the encryption apparatus, a request to update the decryption key and a request to initialize the parameter, together with a request to pay a predetermined amount, and the key updating unit updates the encryption key and the decryption key only when the decryption key updating request unit has paid the predetermined amount and the parameter initialization unit sets the random parameter to the initial value only when the parameter initialization request unit has paid the predetermined amount. In addition, the plaintext is content data, and the updating unit does not perform updating of the random parameter for a predetermined period of time when the predetermined amount is paid.

Thus, by making the use of the tendency that the probability that the receiving apparatus fails to decrypt the content of the encrypted communications increases gradually, it is possible, for example, to distribute the content data for free for a certain period of time, allow the receiving apparatus to update the key only when the charges are paid, and thereby provide the encryption system applicable to the content data delivery.

As explained above, the present invention therefore is conceived considering the above problems in the conventional system and provides the encryption system in which the transmission apparatus increases the random parameter as time passes, using the NTRU™ encryption method for the encrypted communications. Thus, it is possible to prevent the receiving apparatus from decrypting correctly the content of the encrypted communications, as time passes.

In this way, the receiving apparatus operated by the outsider with the intention to use maliciously the disclosed private key cannot decrypt the content of the encrypted communications when the transmission apparatus performs the encrypted communications. Thus, it is possible to prevent the content of the encrypted communications from being decrypted continuously by the receiving apparatus operated by the outsider having the disclosed private key, when the private key is disclosed. This allows the prevention of the disadvantage on the side of the sender's when the private key is disclosed in the case of transmitting digital works such as music.

The probability that the receiving apparatus operated by the normal user fails to perform decryption gradually increases as it decrypts the content of the encrypted communications transmitted by the transmission apparatus. Accordingly, it is possible to urge the receiving apparatus or the user operating the receiving apparatus to update the key.

Furthermore, the CRL and the SRM issued by the third party is not required when the transmission apparatus performs the encrypted communications.

What is more, it is also possible to provide the encryption system applicable for the content data delivery, for instance, when the content data is distributed for free for a predetermined period of time so that the key is updated only when the charges are paid by utilizing the tendency that the probability of failing to decrypt the content of the encrypted communications increases gradually.

Thus, the present invention realizes the regular updating of the key in the encryption system, especially an encryption system with high security. Therefore, its practical value is high today where information communication technology and computers widely pervade.

As for further information about technical background to this application, Japanese Patent Application No. 2002-296219, filed Oct. 9, 2002, is incorporated herein by reference.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 11 is a diagram showing a result of measuring a probability of decryption error in an NTRU™ encryption method.

DETAILED DESCRIPTION OF THE INVENTION

Figure 1:
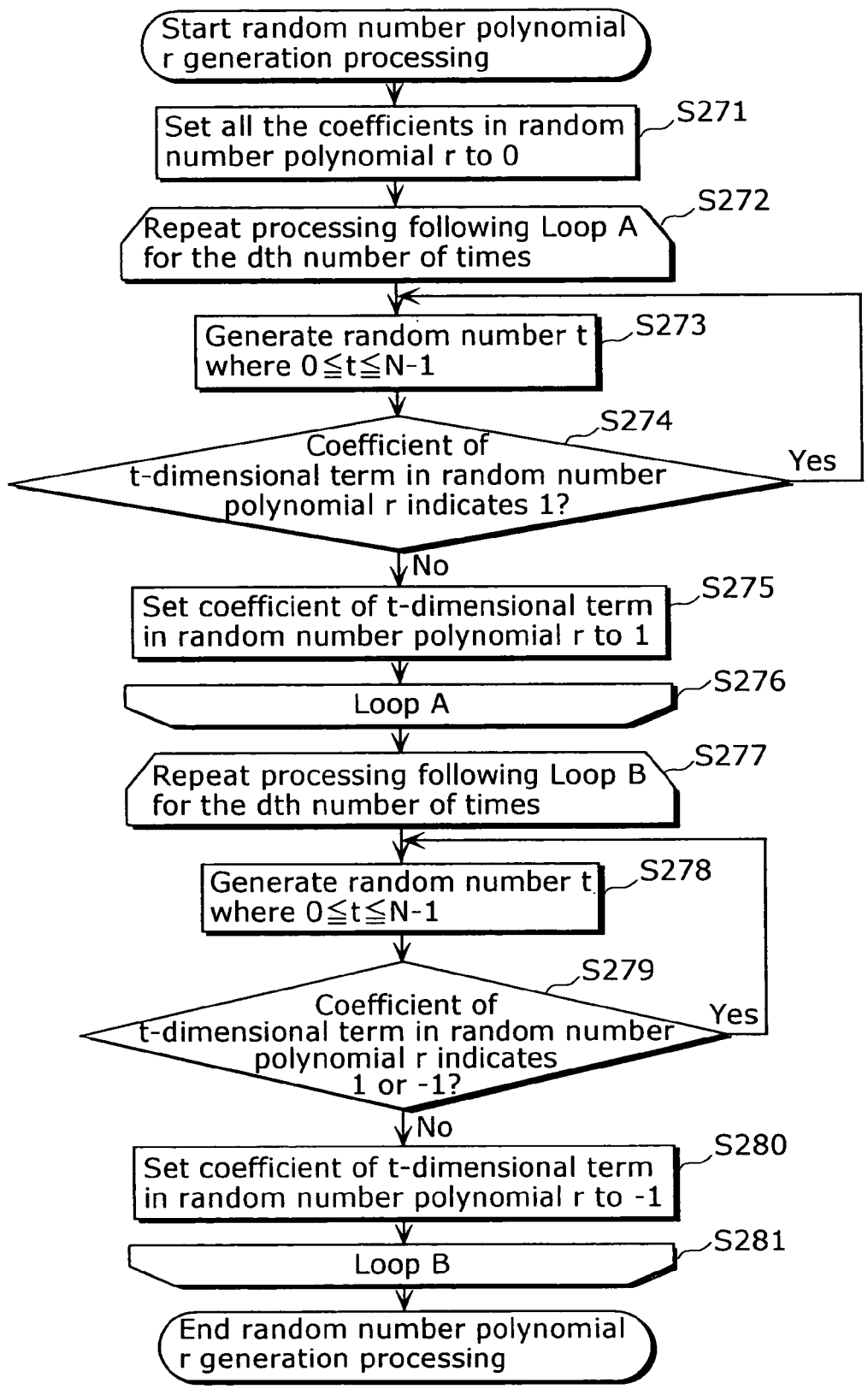
FIG. 1 is a flowchart showing a sequence of random number polynomial generation processing according to embodiments of the present invention.

The following describes the embodiments according to the present invention in detail with reference to the diagrams.

The encryption system according to the present invention employs the NTRU™ encryption method as an example of a public key encryption method. The NTRU™ encryption method performs encryption and decryption using polynomial calculations. As for the NTRU™ encryption method, the methods of generating the public key and the private key based on the NTRU™ encryption method is described in detail in "NTRU: A ring based public key cryptosystem", Lecture Notes in Computer and Science, 1423, pp. 267-288, Jeffery Hoffstein, Jill Pipher, and Josephe H. Silverman, Springer-Verlag, 1998, and therefore, the detailed description is abbreviated here but the following briefly explains the NTRU™ encryption method.

The NTRU™ encryption method has integer system parameters N, p and q. In the reference mentioned above, three examples are cited as the examples of the system parameters: (N, p, q)=(107, 3, 64), (N, p, q)=(167, 3, 128), (N, p, q)=(503, 3, 256).

The embodiments of the cryptosystem according to the present invention describes the case of considering the system parameter N where N=167.

The NTRU™ encryption method is a public key encryption method for performing encryption and decryption using polynomial calculations. Firstly, the polynomial equation used in the NTRU™ encryption method is an n-dimensional polynomial where "n" is less than or equal to (N−1) based on the system parameter N. For example, when N=5, the equation is an n-dimensional polynomial where "n" is less than or equal to 4 such as "X^4+X^3+1". Here "X^a" means X to the ath power. Any of a public key h, private key f, plaintext m, random number r, and encrypted text c used for encryption and decryption is expressed respectively as the n-dimensional polynomial where "n" is less than or equal to (N−1) (hereafter respectively called public key h, private key polynomial f, plaintext polynomial m, random number polynomial r and encrypted text polynomial c). Here, the system parameter N is 167. Therefore, assume that the plaintext m is expressed using binary expression, it is possible to express information equivalent to 167 bits. Here, the plaintext polynomial m is expressed using 128, which is the maximum value of binary exponential of 2, not exceeding 167, as bits of the plaintext m.

The polynomial is operated using a relational expression X^N=1 for the system parameter N so that the polynomial is always an n-dimensional polynomial where "n" is less than or equal to (N−1). For example, when N=5, a product of a polynomial "X^4+X^2+1" and a polynomial "X^3+X" is operated as below, assuming a product of polynomials is expressed by "x" and a product of an integer and a polynomial is expressed by "·", with the equation X^5=1, so that the polynomial always is the n-dimensional polynomial where "n" is less than or equal to (N−1).

$$(X^4 + X^2 + 1) \times (X^3 + X) = X^7 + 2 \cdot X^5 + 2 \cdot X^3 + X$$
$$= X^2 \times 1 + 2 \cdot 1 + 2 \cdot X^3 + X$$
$$= 2 \cdot X^3 + X^2 + X + 2$$

When coding is performed, an encryption algorithm E that is a polynomial calculation is performed to the plaintext polynomial m using the random number polynomial r and the public key polynomial h described below so that the encrypted text polynomial c=E (m, r, h) is generated. Here, E (m, r, h) is a result of the polynomial calculation obtained by inputting the plaintext polynomial m, the random number polynomial r and the public key polynomial h to the encryption algorithm E, based on the NTRU™ encryption method. As for the encryption algorithm E, the detail is described in the reference mentioned above, and therefore, its description is not reiterated here.

In the NTRU™ method, a parameter d (d is an integer) for generating the random number polynomial r is predetermined and the random number polynomial r is generated so that "d" coefficients equal 1, another "d" coefficients equal −1 and other coefficients equal 0. Namely, the random number polynomial r is an n-dimensional polynomial where "n" is less than or equal to (N−1) and has "N" coefficients from 0 degree (constant term) to the (N−1)th degree. The random number polynomial r is selected so that, among "N" coefficients, "d" coefficients equal 1, another "d" coefficients equal −1 and (N−2d) coefficients equal 0. According to the reference mentioned above, when N=167 is defined for the parameter N, it is defined that d=18. Namely, the random number polynomial r is selected so that 18 coefficients equal 1, another 18 coefficients equal −1 and 131 (=167−36) coefficients equal 0.

For example, the random number polynomial r is generated according to the algorithm as shown in FIG. 1. Firstly, all the "N" coefficients in the random number polynomial r are set to 0 (Step S271). Then, an integer random number t ranged from 0 to (N−1) is generated (Step S273). For the generation of the random number, a rand function which is a standard library function operated by Programming Language C is used. Next, whether or not the coefficient of the term of the "t"th degree in the random number polynomial r indicates 1 is examined based on the generated random number t (Step 274). When it indicates 1 (Yes in Step S273), the random number generation processing (Step S 273) is repeated again. When it indicates 0 (No in Step S 273), the coefficient of the term of the "t"th degree in the random number polynomial r is set to 1 (Step S275). The processing is repeated until "d" coefficients in the random number polynomial r equal 1 (Steps S272~S276).

Then, the integer random number t ranged from 0 to (N−1) is generated (Step S278). Whether the coefficient of the term of the "t"th degree in the random number polynomial r indicates 1 or −1 is examined based on the generated random number t (Step S279). When it indicates either 1 or −1 (Yes in Step S279), the random number generation processing (Step S278) is repeated again. When it indicates 0 (No in Step S279), the coefficient of the term of the "t"th degree in the random number polynomial r is set to −1 (Step S280). The processing is repeated until "d" coefficients in the random number polynomial r equal −1 (Steps S277~S281). The random number polynomial r is generated as described above.

At the time of decoding, decryption algorithm D that is a polynomial calculation is performed to the encrypted text polynomial c using the private key polynomial f so that the decrypted text polynomial m'=D (c, f) is generated. Here, D (c, f) is a result of the polynomial calculation obtained by inputting the encrypted text polynomial c and the private key polynomial f to the decryption algorithm D, based on the NTRU™ encryption method. As for the decryption algorithm D, the detail is described in the reference mentioned above, therefore, its explanation is not repeated here.

Meanwhile, with the use of the NTRU™ encryption method, there rises a case in which decrypted text polynomial m' differs from the plain text polynomial m. In this case, the plaintext polynomial m cannot be gained correctly at the time of decoding. This is a state referred to as "a decryption error occurs". The occurrence of the decryption error depends on the combination of the random number polynomial r, the plaintext polynomial m, the public key polynomial h and the private key polynomial f. To be more precise, the public key polynomial h is generated as a result of calculating the private key polynomial f and the random polynomial g. When the values of the coefficients in the random number polynomial (p·r×g+f×m), which is a result of the calculation of the random polynomial g, the random number polynomial r, the plaintext polynomial m and the private key polynomial f, does not indicate a value ranged from −q/2 to q/2, the decryption error occurs. There is no such way to prevent the occurrence of the decryption error, however, according to the above-mentioned reference, it is specified that almost no such errors occur and no problems are generated in practice when it is defined as d=18 in the case of N=167.

FIRST EMBODIMENT

Figure 2:
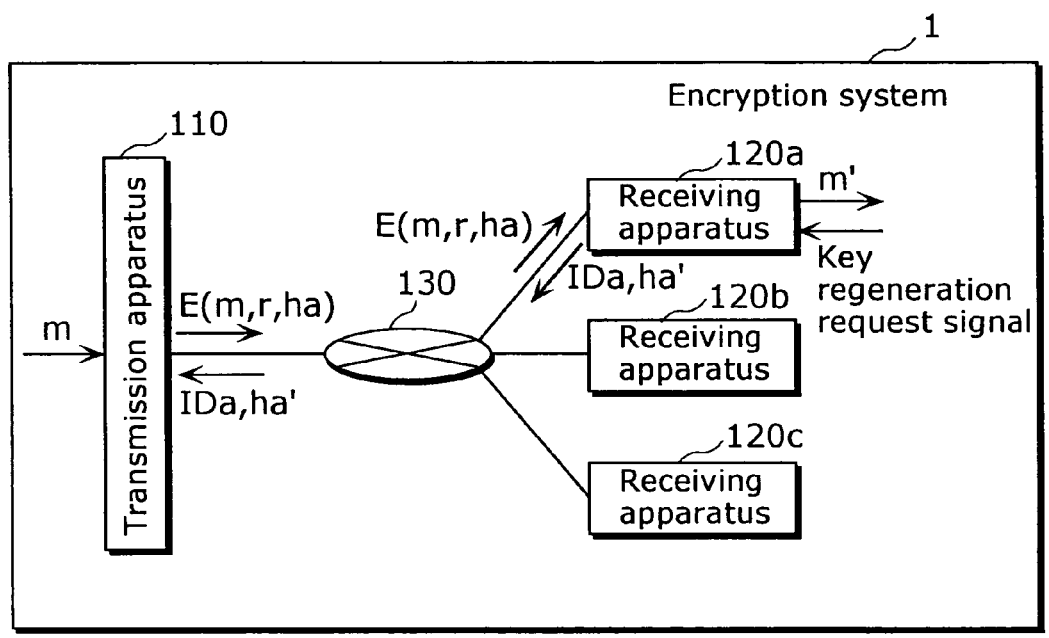
FIG. 2 is a diagram showing a structure of an encryption system 1 according to a first embodiment of the present invention.

The whole structure of the encryption system 1 according to the first embodiment of the present invention is shown in FIG. 2.

The encryption system 1 is a system for performing encrypted communications for the plaintext polynomial m and includes a transmission apparatus 110 and a plurality of receiving apparatuses 120a, 120b and 120c. The transmission apparatus 110 and the receiving apparatuses 120a, 120b and 120c are connected to each other via a transmission line 130.

The following explains in detail the components of the transmission apparatus 110 as well as those of the receiving apparatus 120a assuming that the transmission apparatus 110 performs encrypted communications with the receiving apparatus 120a selected out of the multiple receiving apparatuses.

Figure 3:
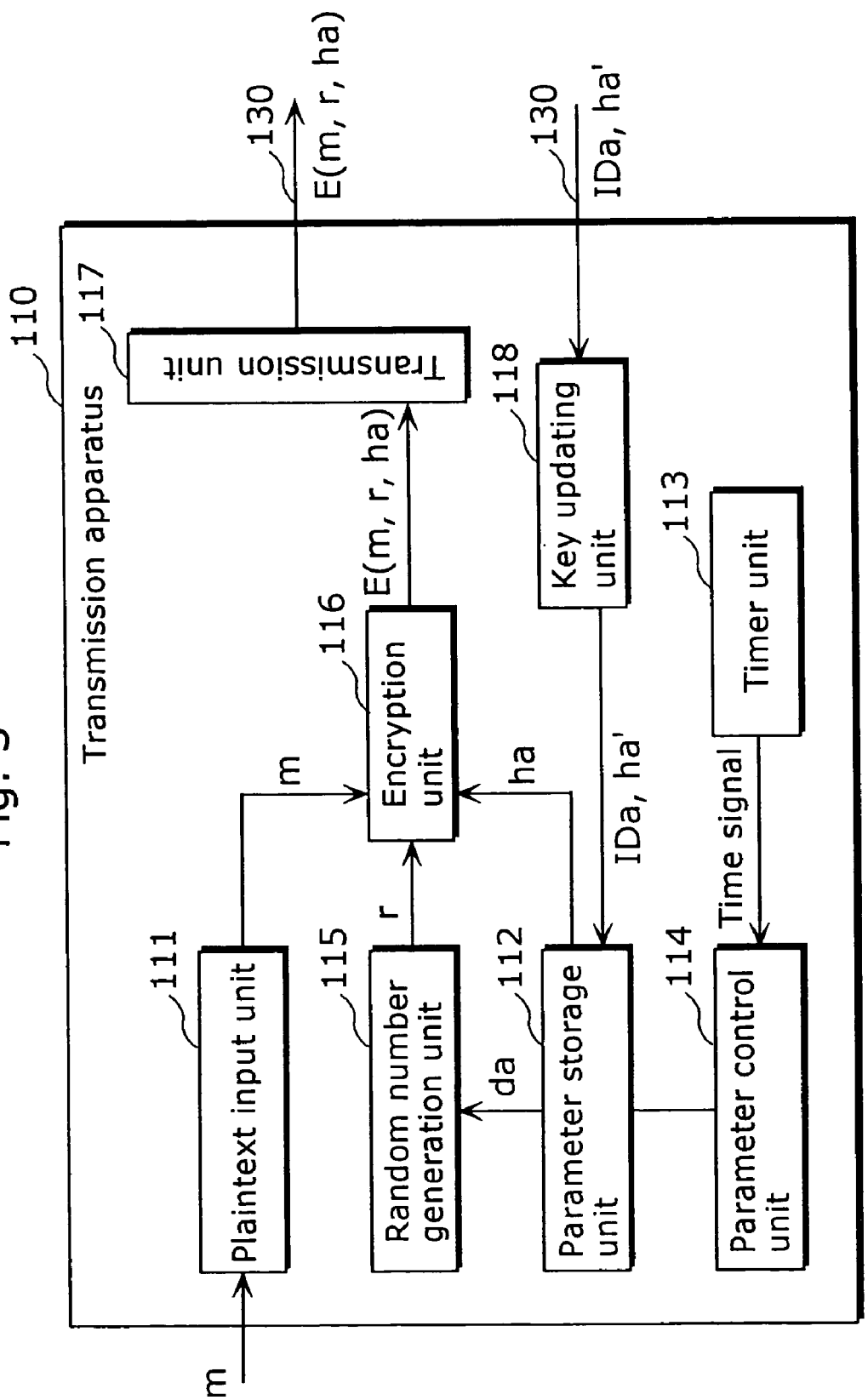
FIG. 3 is a diagram showing a structure of a transmission apparatus 110 according to the first embodiment of the present invention.
Figure 4:
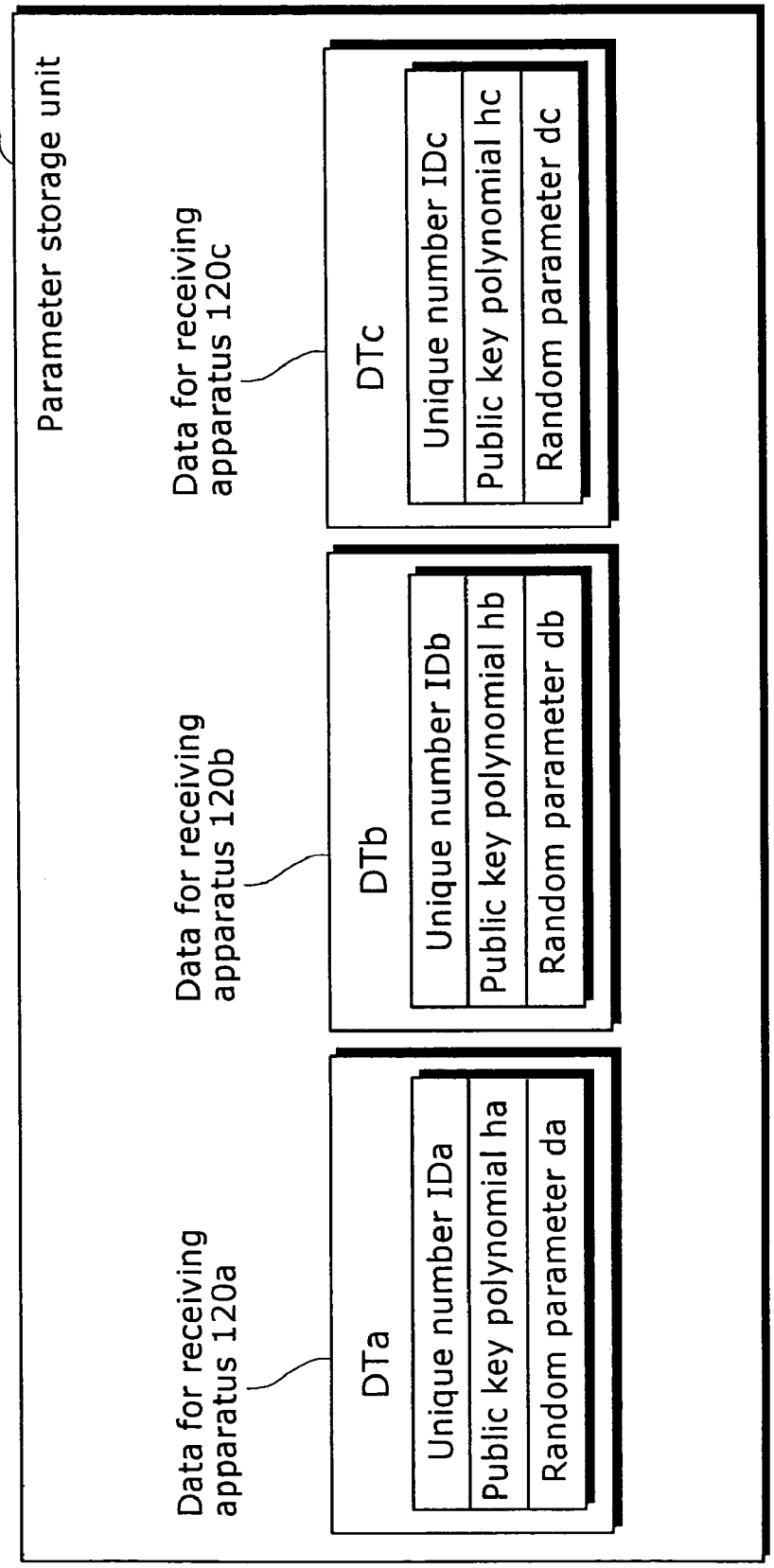
FIG. 4 is a diagram showing a structure of a parameter storage unit 112 according to the first embodiment of the present invention.

The transmission apparatus 110 includes a plaintext input unit 111, a parameter storage unit 112, a timer unit 113, a parameter control unit 114, a random number generation unit 115, an encryption unit 116, a transmission unit 117 and a key updating unit 118, as shown in FIG. 3.

The plaintext input unit 111 outputs to the encryption unit 116 the plaintext polynomial m inputted from exterior.

The parameter storage unit 112 stores unique number IDa, a public key polynomial ha and a random parameter da of the receiving apparatus 120a as a set of data DTa=(IDa, ha, da) (the receiving apparatuses 120b and 120c stores respectively data DTb=(IDb, hb, db) and data DTc=(IDc, hc, dc) in the same way). Here, the random parameter da is a parameter for generating the random number polynomial r used for encryption and signifies the number of the coefficients indicating 1 and the number of the coefficients indicating −1, of the coefficients in the random number polynomial r. As for the initial vector of the random parameter da, it is defined as da=18.

The timer unit 113 generates a time signal per day and inputs it to the parameter control unit 114.

The parameter control unit 114, receiving the time signal from the timer unit 113, increases the value of the random parameter da stored in the parameter storage unit 112 by 1 (the values of the random parameters db and dc are increased in the same way).

The random number generation unit 115 reads out the random parameter da of the receiving apparatus 120a from the parameter storage unit 112 and then generates at random the random number polynomial r where "da" coefficients equal 1, another "da" coefficients equal −1 and other coefficients equal 0, based on the random parameter da. The method of generating the random number polynomial r is as described above. The random number generation unit 115 then outputs the generated random number polynomial r to the encryption unit 116.

The encryption unit 116 has an encryption algorithm E based on the NTRU™ encryption method in advance.

The encryption unit 116 receives the plaintext polynomial m from the plaintext input unit 111, reads out from the parameter storage unit 112 the public key polynomial ha of the receiving apparatus 120a and receives the random number polynomial r from the random number generation unit 115. The encryption unit 116 outputs the generated encrypted text polynomial (m, r, ha) to the transmission unit 117.

The transmission unit 117 transmits the encrypted text polynomial E (m, r, ha) to the receiving apparatus 120a via the transmission line 130.

The key updating unit 118 can receive unique numbers and new public key polynomials respectively from the receiving apparatuses 120a, 120b and 120c via the transmission line 130. When receiving the unique number IDa and the public key polynomial ha' of the receiving apparatus 120a, the key updating unit 118 updates the data DTa=(IDa, ha, da) to data DTa'=(IDa, ha', da'). Here, da' is an initial value of the random parameter defined as da'=18 (when receiving the unique numbers and public key polynomials from the receiving apparatuses 120b and 120c, the key updating unit 118 updates respectively the data DTb to data DTb' and the data DTc to DTc').

The transmission apparatus 110 described above performs asynchronously in parallel encrypted communication processing, random parameter updating processing and public key updating processing described below (any order is possible).

The following describes separately the operations of the three types of processing mentioned above.

Figure 5:
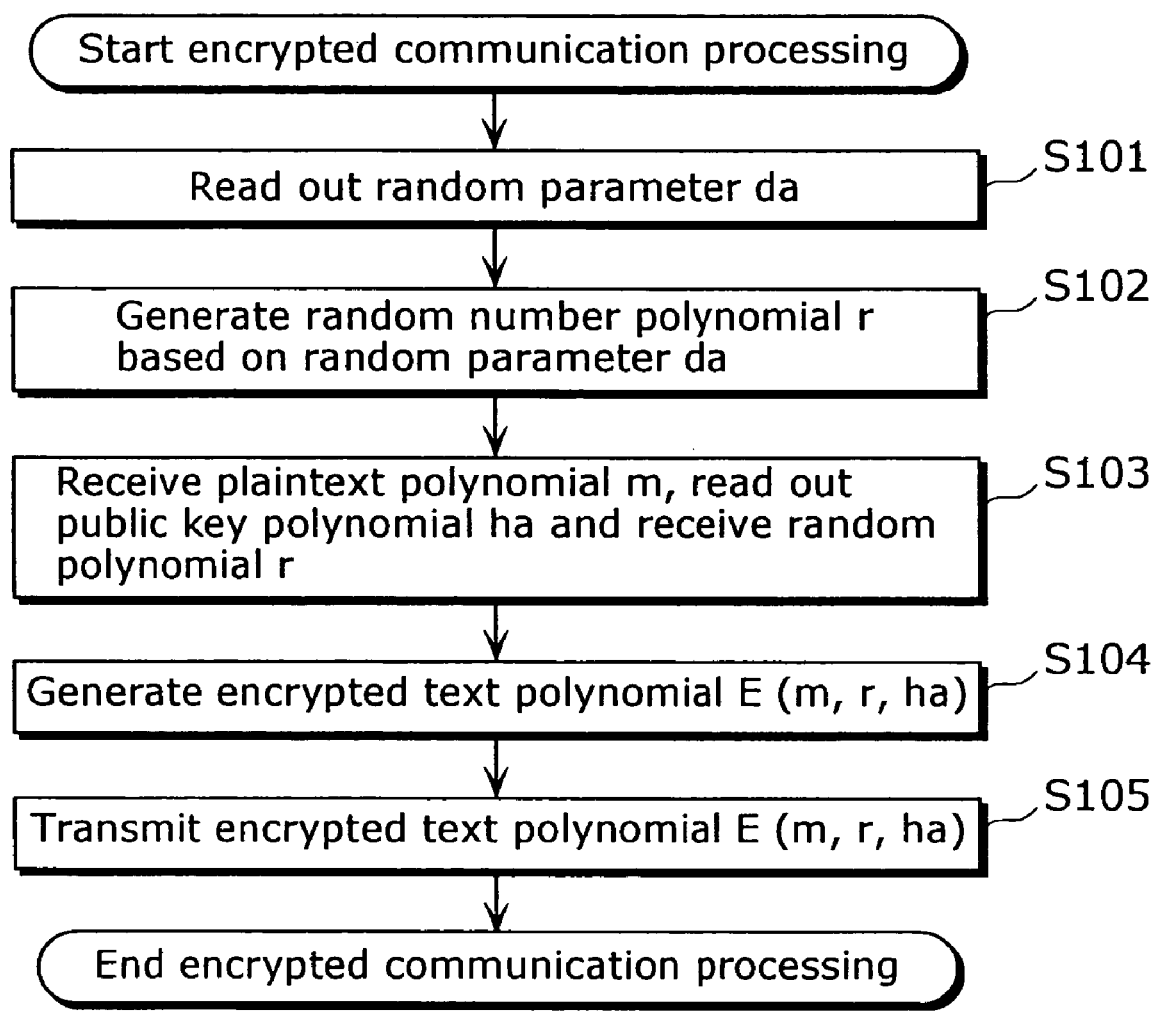
FIG. 5 is a flowchart showing a sequence of encrypted communication processing performed by the transmission apparatus 110 according to the first embodiment of the present invention.

As a start, the operation of the encrypted communication processing is described with reference to the flowchart shown in FIG. 5.

Firstly, the random number generation unit 115 reads out the random parameter da of the receiving apparatus 120a from the parameter storage unit 112 (Step S101). The random number generation unit 115 then generates at random the random number polynomial r in which "da" coefficients equal 1, "da" coefficients equal −1 and other coefficients equal 0, based on the random parameter da that is read out from the parameter storage unit 112, and outputs the generated random number polynomial r to the encryption unit 116 (Step S102). The method of generating the random number polynomial r is as described with reference to FIG. 1.

Next, the encryption unit 116 receives the plaintext polynomial m from the plaintext input unit 111 and also reads out the public key polynomial ha of the receiving apparatus 120a from the parameter storage unit 112. Moreover, the encryption unit 116 receives the random number polynomial r from the random number generation unit 115 (Step S103). The encryption unit 116 then generates the encrypted text polynomial E (m, r, ha) by performing the encryption algorithm E to the plain text polynomial m, using the random number polynomial r and the public key polynomial ha and outputs the generated encrypted text polynomial E (m, r, ha) to the transmission unit 117 (Step S104).

The transmission unit 117 ends the processing after transmitting the received encrypted text polynomial E (m, r, ha) to the receiving apparatus 120a via the transmission line 130 (Step S105).

Figure 6:
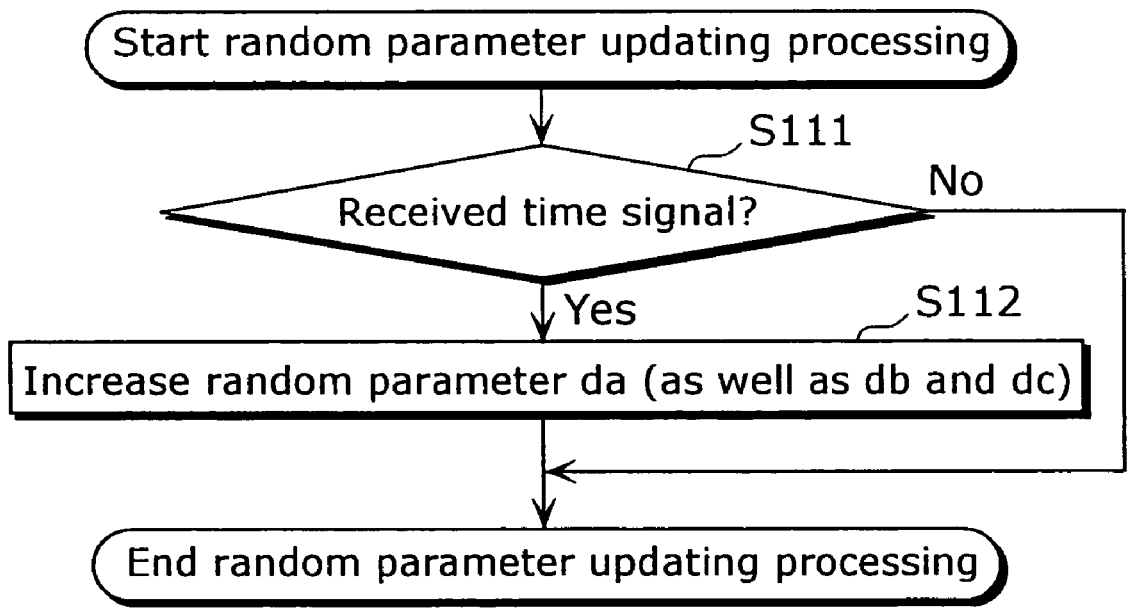
FIG. 6 is a flowchart showing a sequence of processing for updating a random parameter performed by the transmission apparatus 110 according to the first embodiment of the present invention.

The following explains the random parameter updating processing performed by the transmission apparatus 110, with reference to the flowchart shown in FIG. 6.

When receiving the time signal from the timer unit 113 (Yes in Step S111), the parameter control unit 114 increases the value of the random parameter da stored in the parameter storage unit 112 by 1 (the values of the random parameters db and dc are increased by 1 in the same way) and terminates the processing (Step S112). When the parameter control unit 114 does not receive the time signal from the timer unit 113 (No in Step S111), no processing is followed.

Figure 7:
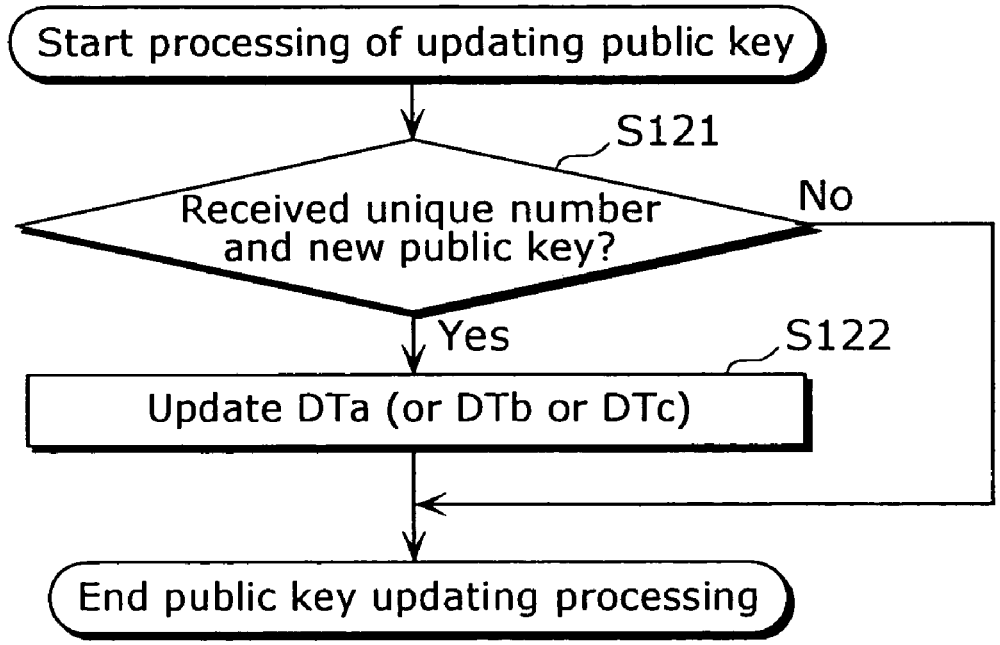
FIG. 7 is a flowchart showing a sequence of processing for updating a public key performed by the transmission apparatus 110 according to the first embodiment of the present invention.

The following describes the public key updating processing performed by the transmission apparatus 110, with reference to the flowchart shown in FIG. 7.

When receiving the unique number IDa and a new public key polynomial ha' from the receiving apparatus 120a (Yes in Step S121), the key updating unit 118 updates the data DTa= (IDa, ha, da) stored in the parameter storage unit 112 to data DTa'=(IDa, ha', da') and terminates the processing (when receiving unique numbers and new public keys from the receiving apparatuses 120b and 120c, the data DTb and DTc is respectively updated to DTb' and DTc').

When the key updating unit 118 does not receive any unique numbers and public key polynomials from any of the receiving apparatuses 120a, 120b and 120c (No in Step S121), no processing is performed.

Figure 8:
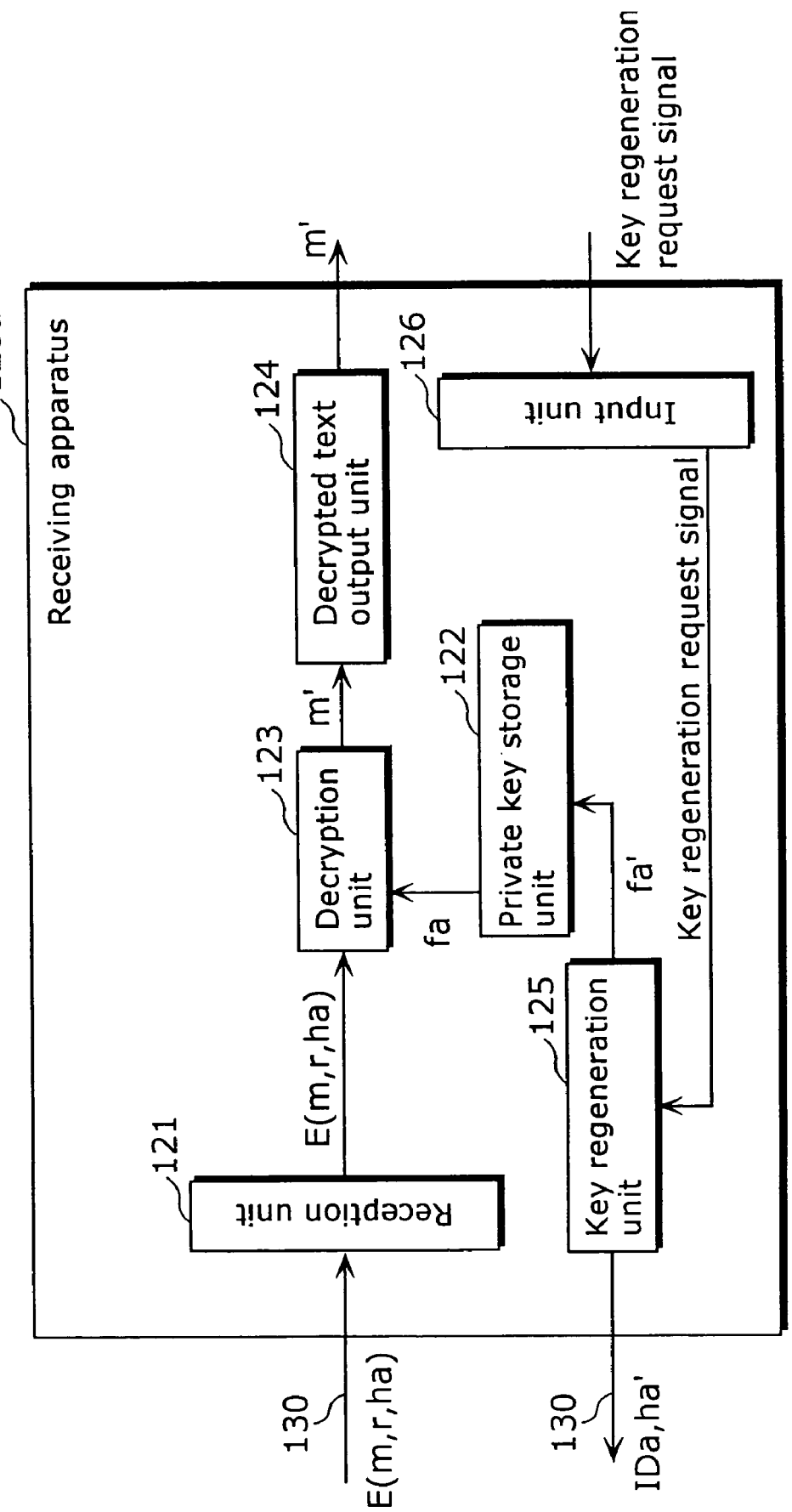
FIG. 8 is a diagram showing a structure of a receiving apparatus 120a according to the first embodiment of the present invention.

The receiving apparatus 120a includes a reception unit 121, a private key storage unit 122, a decryption unit 123, a decrypted text output unit 124, a key regeneration unit 125 and an input unit 126, as shown in FIG. 8.

The reception unit 121 receives the encrypted text polynomial E (m, r, ha) from the transmission apparatus 110 via the transmission line 130 and outputs it to the decryption unit 123.

The private key storage unit 122 stores the private key polynomial fa of the receiving apparatus 120a.

The decryption unit 123 has in advance a decryption algorithm D based on the NTRU™ encryption method, which is an inverse conversion of the encryption algorithm E included in the encryption unit 116.

The decryption unit 123 receives the encrypted text polynomial E (m, r, ha) from the reception unit 121 and reads out the private key polynomial fa of the receiving apparatus 120a from the private key storage unit 122. The decryption unit 123 then generates decrypted text polynomial m'=D (E (m, r, ha), fa) by performing the decryption algorithm D to the encrypted text polynomial E (m, r, ha), using the private key polynomial fa and outputs the generated decrypted text polynomial m' to the decrypted text output unit 124.

The decrypted text output unit 124 receives the decrypted text polynomial m' from the decryption unit 123 and outputs it to the exterior of the receiving apparatus 120a.

When receiving the key regeneration request signal via the input unit 126, the key regeneration unit 125 regenerates newly the private key polynomial fa' and the public key polynomial ha' based on the NTRU™ encryption method. After that, the key regeneration unit 125 updates the private key polynomial fa stored in the private key storage unit 122 to a private key polynomial fa' and then sends the unique number IDa of the receiving apparatus 120a and the new public key polynomial ha' to the transmission apparatus 110 via the transmission line 130.

The user operating the receiving apparatus 120a can input, to the input unit 126, the key regeneration request signal instructing the regeneration of the public key polynomial ha and the private key polynomial fa of the receiving apparatus 120a. The key regeneration request signal is a signal to be inputted by the user for the regeneration of the public key polynomial ha and the private key polynomial fa for the reason that the decrypted text polynomial m' outputted from the decrypted text output unit 124 cannot be obtained correctly or the like.

The input unit 126 outputs, to the key regeneration unit 125, the key regeneration request signal inputted from outside.

The receiving apparatus 120a as described above performs asynchronously in parallel the decryption processing and the key updating processing described below (any order is possible).

The following describes separately the operations of the decryption processing and key updating processing performed by the receiving apparatus 120a.

Figure 9:
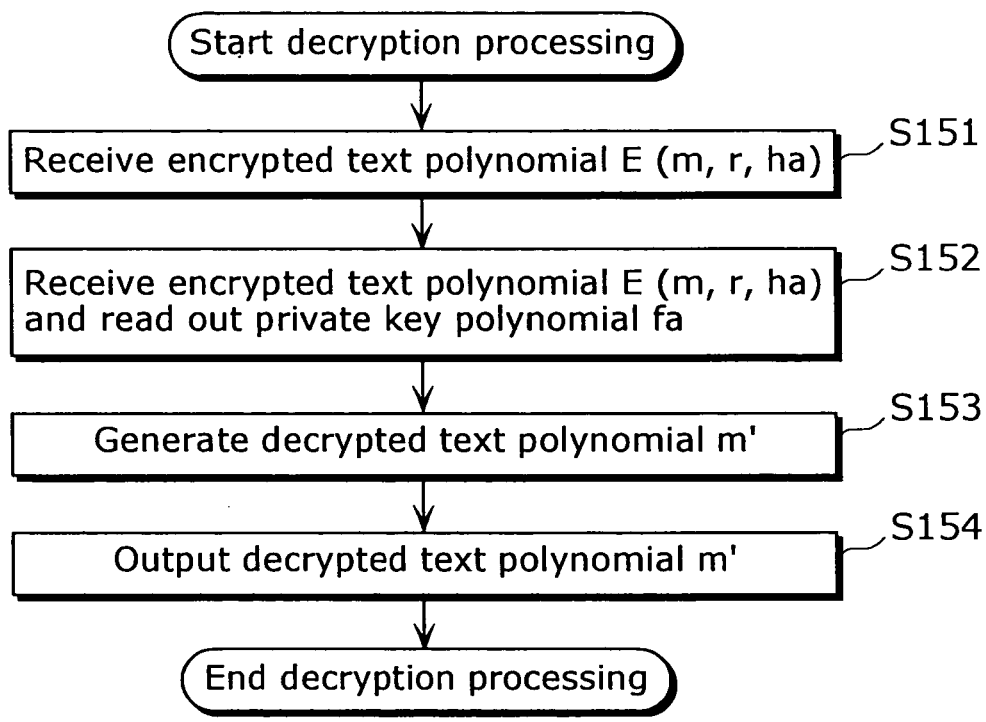
FIG. 9 is a flowchart showing a sequence of decoding processing performed by the receiving apparatus 120a according to the first embodiment of the present invention.

Firstly, the decryption processing performed by the receiving apparatus 120a is described with reference to the flowchart shown in FIG. 9.

The reception unit 121 receives the encrypted text polynomial E (m, r, ha) from the transmission apparatus 110 via the transmission line 130 and outputs it to the decryption unit 123 (Step S151).

The decryption unit 123 receives the encrypted text polynomial E (m, r, ha) from the reception unit 121 and reads out the private key polynomial fa of the receiving apparatus 120a from the private key storage unit 122 (Step S152). The decryption unit 123 then generates decrypted text polynomial m'=D (E (m, r, ha), fa) by performing the decryption algorithm D to the encrypted text polynomial E (m, r, ha), using the private key polynomial fa, and outputs it to the decrypted text output unit 124 (Step S153).

The decrypted text output unit 124 receives the decrypted text polynomial m' from the decryption unit 123, outputs it to outside and terminates the processing (Step S154).

Figure 10:
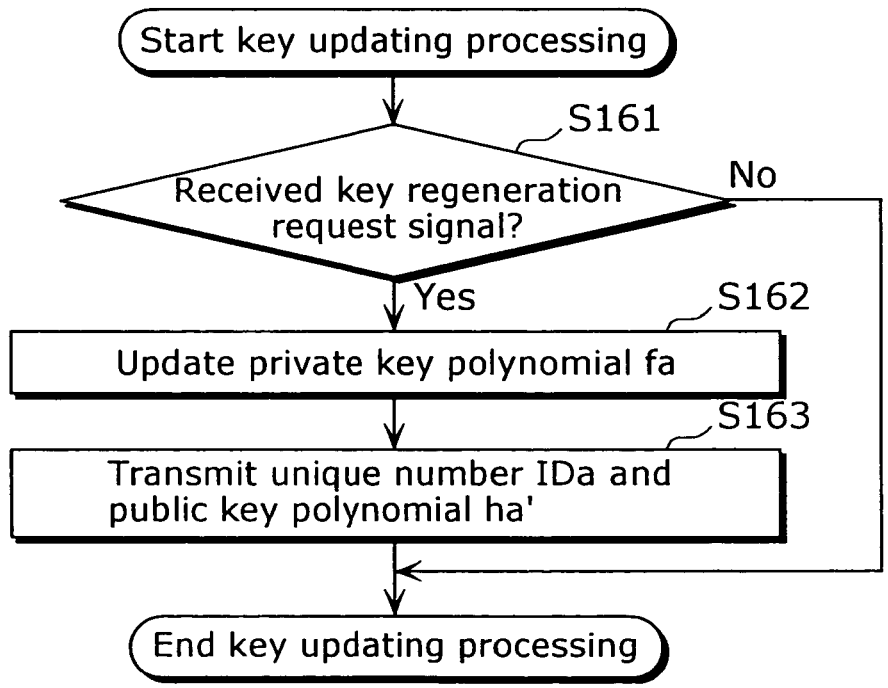
FIG. 10 is a flowchart showing a sequence of processing for updating a key performed by the receiving apparatus 120a according to the first embodiment of the present invention.

The following describes the key updating processing performed by the receiving apparatus 120a, with reference to the flowchart shown in FIG. 10.

When receiving the key regeneration request signal via the input unit 126 (Yes in Step S161), the key regeneration unit 125 regenerates newly the private key polynomial fa' and the public key polynomial ha' based on the NTRU™ encryption method. After that, the key regeneration unit 125 updates the private key polynomial fa stored in the private key storage unit 122 to a newly generated private key polynomial fa' (Step S162). The key regeneration unit 125 also sends the unique number IDa as well as the new public key polynomial ha' of the receiving apparatus 120a to the transmission apparatus 110 via the transmission line 130 and terminates the processing (Step S163).

When the key regeneration unit 125 does not receive the key regeneration request signal via the input unit 126 (No in Step S161), no processing is performed.

The following describes the whole operation of the encryption system 1 according to the first embodiment.

Here, in the encryption system 1, it is assumed that the transmission apparatus 110 performs encrypted communications with the receiving apparatus 120a selected out of the plural receiving apparatuses.

Firstly, the transmission apparatus 110 stores the unique number IDa, the public key polynomial ha and random parameter da of the receiving apparatus 120a as data DTa= (IDa, ha, da) in the parameter storage unit 112 (the receiving apparatuses 120b and 120c store respectively data DTb= (IDb, hb, db) and data DTc=(IDc, hc, dc) in the same way). The initial values of the random parameters da, db and dc are defined as da=db=dc=18.

The transmission apparatus 110 then encrypts the plaintext polynomial m and generates the encrypted text polynomial E (m, r, ha) according to the encrypted communication processing performed by the transmission apparatus 110 and transmits the generated encrypted polynomial E (m, r, ha) to the receiving apparatus 120a via the transmission line 130. On the other hand, the receiving apparatus 120a receives the encrypted polynomial E (m, r, ha) from the transmission apparatus 110 via the transmission line 130, according to the decryption processing described above. The receiving apparatus 120a then decrypts the received encrypted text polynomial E (m, r, ha) and outputs the decrypted text polynomial m'.

In the transmission apparatus 110, the timer unit 113 generates a time signal per day. The parameter control unit 114 responds to the time signal generated per day by the timer unit 113 and increases all the random parameters da, db and dc stored in the parameter storage unit 112 by 1, according to the random parameter updating processing. Namely, all the random parameters stored in the parameter storage unit 112 increases every day.

Therefore, when the transmission apparatus 110 continues the encrypted communication processing, the number of the coefficients indicating 1 and that of the coefficients indicating −1 in the random number polynomial r used for generating the encrypted text polynomial E (m, r, ha) increase every day.

FIG. 11 shows a result of measuring the probability of decryption error in employing the NTRU™ encryption method in the case of using the random number polynomial r where N=167, the "d" coefficients equal 1, another "d" coefficients equal −1 and other coefficients equal 0. According to the measuring result, almost no decryption errors occur in decrypting the encrypted text polynomial E (m, r, ha) generated by the transmission apparatus 110 when the initial value of the random parameter da is defined as da=18 (the receiving apparatus 120 can obtain the decrypted text polynomial m' equivalent to the plaintext polynomial m from the received encrypted text polynomial E (m, r, ha)). However, upon the passage of time, the random parameter da increases day by day so that the decryption error probability in decrypting the encrypted text polynomial E (m, r, ha) generated by the transmission apparatus 110 increases gradually (the receiving apparatus 120 cannot obtain the decrypted text polynomial m' equivalent to the plaintext polynomial m from the received encrypted text polynomial E (m, r, ha)).

When the probability that the receiving apparatus 120 can obtain the decrypted text polynomial m' equivalent to the plaintext polynomial m decreases which prevents the practical encrypted communications, the user operating the receiving apparatus 120a can input, in the input unit 126, the key regeneration request signal instructing the regeneration of the public key polynomial ha and the private key polynomial fa of the receiving apparatus 120a by performing the key updating processing. Thus, with the public key updating processing performed by the transmission apparatus 110, the random parameter da in the parameter storage unit 112 is updated to the initial value da'=18. In this way, the decryption error probability decreases to the initial state so that the receiving apparatus 120a can perform encrypted communications practically.

The decrease of the probability of the decryption error from 2.6% to 2.3% in spite of the increase in the value of the random parameter d from 38 to 48, as shown in the diagram, is due to a gap between a theoretical value and a found value. Therefore, it is proved theoretically that the probability of the decryption error increases as the parameter of the found value increases and thereby the value of the random parameter d increases.

As explained above, with the encryption system 1 according to the first embodiment, the transmission apparatus 110 increases the number of the coefficients indicating 1 and that of the coefficients indicating −1, as time passes. Thus, even though the private key polynomial fa possessed by the receiving apparatus 120a is disclosed, the probability of decryption error increases as time passes in the receiving apparatus operated by an outsider who has the intention to use the disclosed private key polynomial fa in a malicious way. Thus, the outsider cannot decrypt correctly the encrypted communications performed by the transmission apparatus 110. Consequently, this encryption system 1 prevents the content of the encrypted communications performed by the transmission apparatus 110 from being decrypted continuously by the receiving apparatus operated by the outsider as described above, which is different from the conventional art. Therefore, the disadvantage on the side of the sender can be avoided when the private key is disclosed, for example, in transmitting digital contents such as music.

Even with the receiving apparatus 120a which has an authenticated private key polynomial fa, the probability of decryption error increases as time passes due to the continuous usage of the same private key polynomial fa and thus the encrypted communications performed by the transmission apparatus 110 cannot be decrypted correctly. Then, the user operating the receiving apparatus 120a is informed that the probability of the decryption error increases as time passes when the same private key polynomial fa is used continuously and that the encrypted communications are not any longer practical without updating the key. Thus, the encryption system 1 can urge the user to input the key regeneration request signal in order to update the key, via the input unit 126 in the receiving apparatus 120. As a result of it, the encryption system 1 can urge the receiving apparatus or the user operating the receiving apparatus to update the key.

Differing from the conventional art, the encryption system 1 does not require the CRL and the SRM issued by the third party.

SECOND EMBODIMENT

The encryption system 2 according to the second embodiment is applicable to the distribution of the digital contents such as movie and music (hereafter referred to as content) with the structure based on the encryption system 1.

The encryption system 2 differs from the encryption system 1 in the respect that it executes the processing below instead of encrypting and transmitting the plaintext polynomial m with the use of the NTRU™ encryption. It means that the encryption system 2 encrypts a content CNTi ($1 \leq i \leq k$) that is digital data, based on a shared key encryption with the use of an encryption key Ki ($1 \leq i \leq k$). The encryption system 2 also encrypts the encryption key Ki ($1 \leq i \leq k$) using the NTRU™ encryption and sends the encrypted content and encryption key. Furthermore, the encryption system 2 differs from the encryption system 1 in the respect that the key is updated using a key server. The detail is described below.

Figure 12:
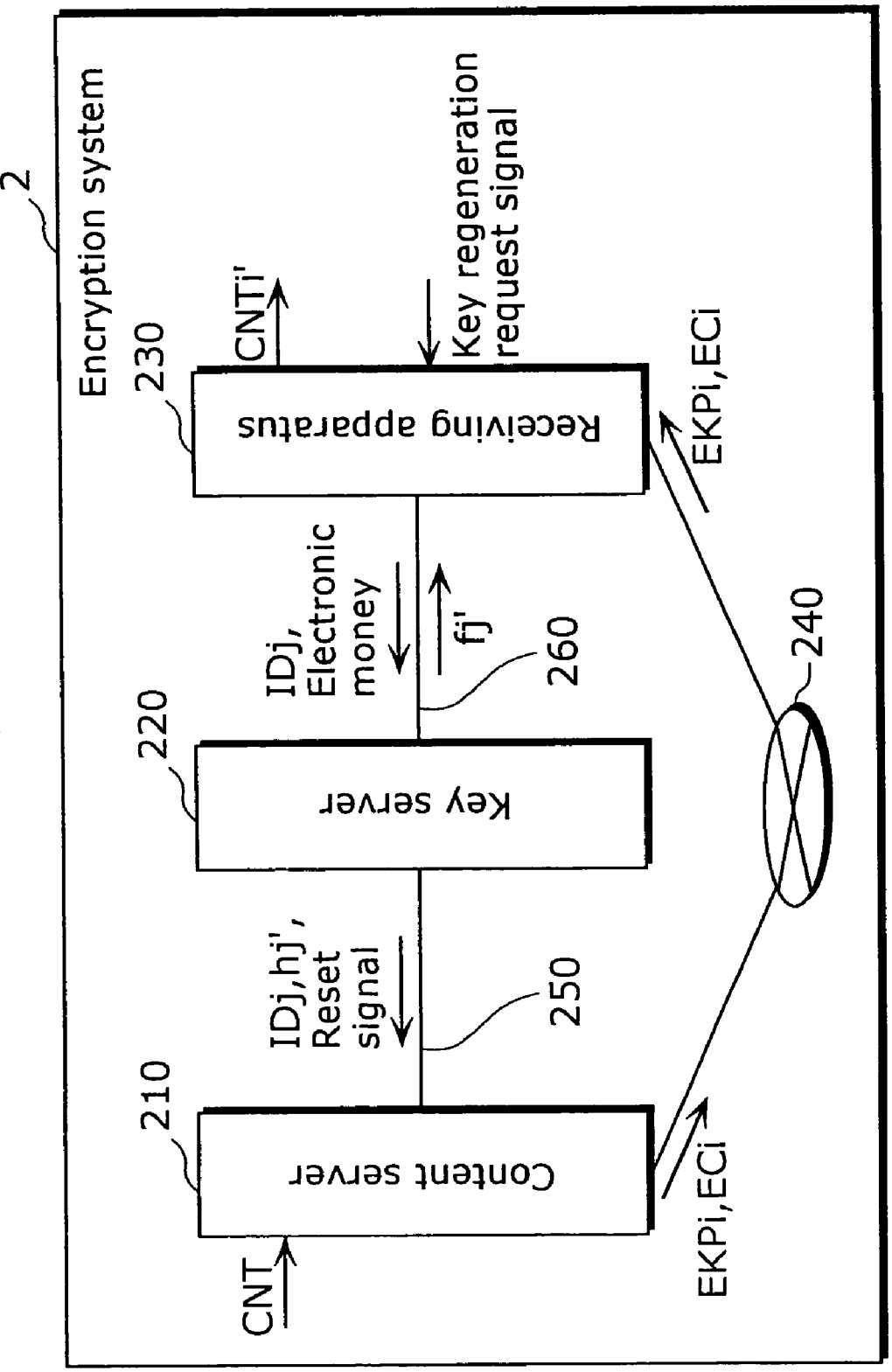
FIG. 12 is a diagram showing a structure of an encryption system 2 according to a second embodiment of the present invention.
Figure 13:
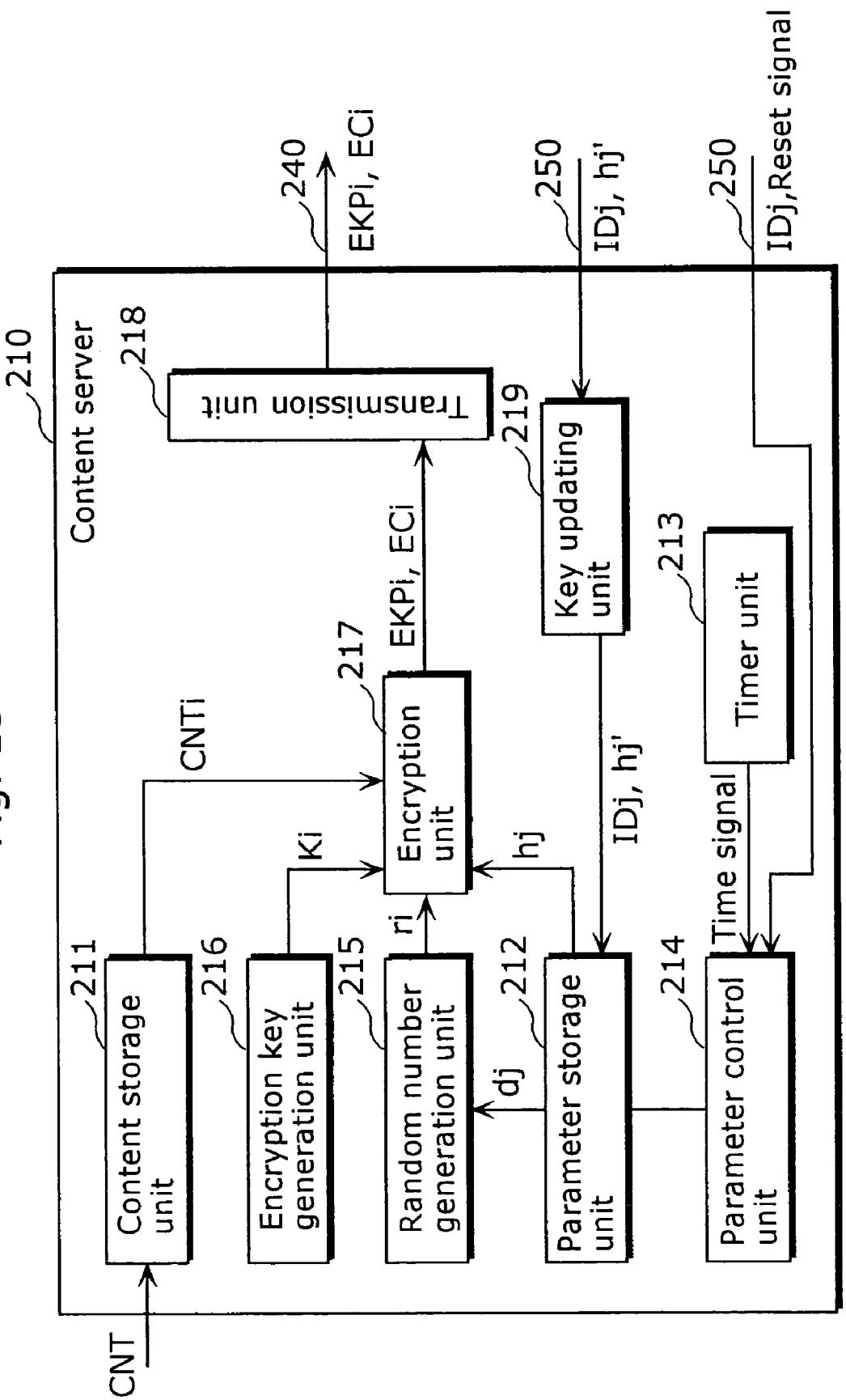
FIG. 13 is a diagram showing a structure of a content server 210 according to the second embodiment of the present invention.

The whole structure of the encryption system 2 according to the second embodiment is shown in FIG. 12. The encryption system 2 is a system for distributing a content CNT and includes a content server 210, a key server 220 and a receiving apparatus 230. The content server 210 and the receiving apparatus 230 are mutually connected via Internet 240. The content server 210 and the key server 220 are connected via a dedicated connection 250. The key server 220 and the receiving apparatus 230 are connected via a telephone circuit 260.

The content server 210 is made available by an agency providing the content CNT for the user j has. The key server 220 is made available by an agency providing the user j with a decryption key for the use of the content CNT. The user j using the content CNT has the receiving apparatus 230. Here, it is defined that the same agency has the content server 210 and the key server 220.

The following describes in detail the components included in the apparatuses mentioned above.

The content server 210 includes a content storage unit 211, a parameter storage unit 212, a timer unit 213, a parameter control unit 214, a random number generation unit 215, an encryption key generation unit 216, an encryption unit 217, a transmission unit 218 and a key updating unit 219.

The content storage unit 211 stores the content CNT inputted from outside, for instance, as MPEG2 data CNTi ($1 \leq i \leq k$) which is the content CNT being sectioned every certain time.

Figure 14:
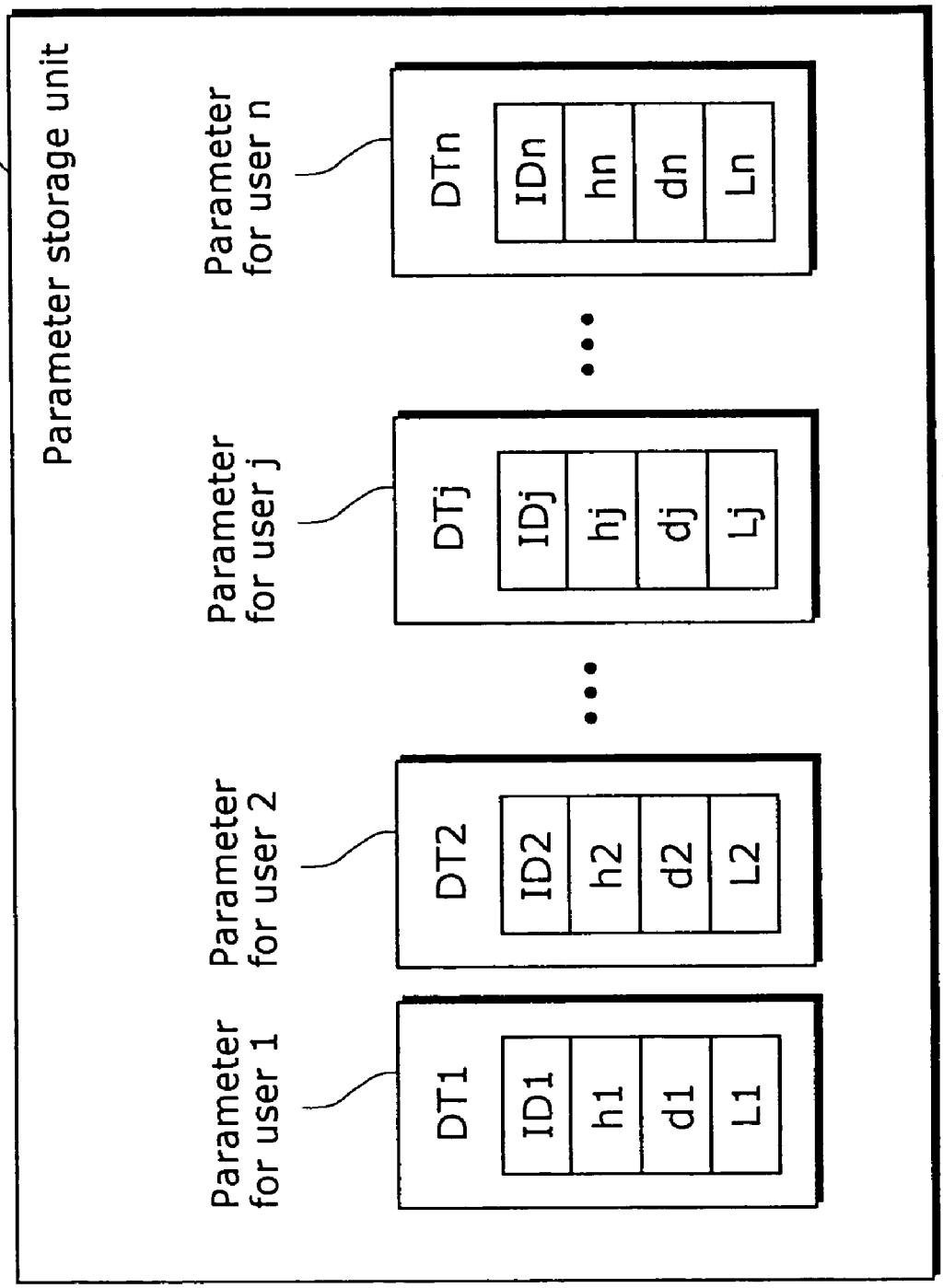
FIG. 14 is a diagram showing a structure of a parameter storage unit 212 according to the second embodiment of the present invention.

The parameter storage unit 212 stores a unique number IDj, a public key polynomial hj and a random parameter dj of the receiving apparatus 230 as a set of data DTj=(IDj, hj, dj, Lj) ($1 \leq j \leq n$) per each user, as shown in FIG. 14. Here, the random parameter dj is a parameter for generating a random number polynomial ri ($1 \leq i \leq k$) used for encryption and indicates the number of the coefficients indicating 1 and that of the coefficients indicating −1. The initial value of the random parameter dj is defined as dj=18.

The timer unit 213 generates a time signal every day and inputs it to the parameter control unit 214.

The parameter control unit 214, receiving the time signal from the timer unit 213, increases the value of the random parameter dj ($1 \leq j \leq n$) of the data DTj stored in the parameter storage unit 212 by 1. When receiving the unique number IDj and a reset signal from the key server 220, the parameter control unit 214 does not update, for a certain time (e.g., a month), the random parameter dj of the data DTj specified by the unique number. This period is defined by an effective period for content use Lj. Thus, the use of the content CNT is allowed for a certain period of time for the users who has paid the charge for using the content CNT.

The random number generation unit 215 reads out the random parameter dj of the receiving apparatus 230 from the parameter storage unit 212. The random number generation unit 215 then generates at random the random number polynomial ri ($1 \leq i \leq =k$) where "dj" coefficients equal 1, another "dj" coefficients equal −1 and other coefficients equal 0, based on the random parameter dj that is read out from the parameter storage unit 212. The generated random number polynomial ri ($1 \leq i \leq k$) is outputted to the encryption unit 217. The method of generating the random number polynomial ri is as described with reference to FIG. 1.

The encryption key generation unit 216 generates at random the encryption key Ki ($1 \leq i \leq k$) and outputs it to the encryption unit 217. The encryption unit 217 has in advance the encryption algorithm E based on the NTRU™ encryption method and a shared key encryption algorithm Sym such as DES (Data Encryption Standard) encryption method.

In the shared key encryption, the shared key encryption algorithm Sym is performed to the plaintext m using the encryption key K and thereby an encrypted text c=Sym (m, K) is generated. Also, the shared key encryption is performed to the encrypted text c using the encryption key K and thereby a decrypted text m'=Sym (c, K) is generated. Here, when the same encryption key K is used for generating encrypted text and for generating decrypted text, the decrypted text m' equals to the plaintext m. As for the shared key encryption and the DES encryption method, the detail is described in *Modern Cryptography*. Mathematics in Information Science. Ser. Tatsuaki Okamoto, and Hirosuke Yamamoto, Sangyo Tosyo, 1997, and therefore, the description is not repeated here.

The encryption unit 217 receives the encryption key Ki ($1 \leq i \leq k$) from the encryption key regeneration unit 216 and converts it into an encryption key polynomial KPi ($1 \leq i \leq k$) so that it can be encrypted using the NTRU™ encryption. The conversion can be realized when the encryption key Ki is defined as a bit stream, for example, by constructing the encryption key polynomial KPi in which the value of the lower bit of the encryption key Ki is a coefficient of $X^b$. Namely, when Ki=10010 (bit expression), KPi=$X^5+X^2$.

The encryption unit 217 reads out the public key polynomial hi of the receiving apparatus 230 from the parameter storage unit 212 and receives the random number polynomial ri ($1 \leq i \leq k$) from the random number generation unit 215. The encryption unit 217 then performs the encryption algorithm based on the NTRU™ encryption to the converted encryption key polynomial KPi ($1 \leq i \leq k$) using the random number polynomial ri ($1 \leq i \leq k$) and the public key polynomial hi and generates an encrypted encryption key polynomial EKPi=E (KPi, ri, hj) ($1 \leq i \leq k$).

The encryption unit 217 receives the content CNTi ($1 \leq i \leq k$) from the content storage unit 211, performs the shared key encryption algorithm Sym to the content CNTi ($1 \leq i \leq k$) using the encryption key Ki ($1 \leq i \leq k$) and generates the encrypted content ECi=Sym (CNTi, Ki) ($1 \leq i \leq k$).

The encryption unit 217 outputs the encrypted encryption key polynomial EKPi ($1 \leq i \leq k$) and the encrypted content ECi ($1 \leq i \leq k$) to the transmission unit 218.

The transmission unit 218 transmits the encrypted encryption key polynomial EKPi ($1 \leq i \leq k$) and the encrypted content ECi ($1 \leq i \leq k$) to the receiving apparatus 230 via the Internet 240.

The key updating unit 219 can receive, from the key server 220 via the dedicated connection 250, both the unique number IDj and the public key polynomial hj' ($1 \leq j \leq n$) of the receiving apparatus 230. When receiving them, the key updating unit 219 updates the data DTj=(IDj, hj, dj) stored in the parameter storage unit 212 to data DTj'=(IDj, hj', dj'). Here, dj' is the initial value of the random parameter dj with the definition of dj'=18.

The content server 210 as described above performs asynchronously in parallel the encrypted communication processing, the random parameter updating processing and the public key updating processing described below (any order is possible).

The following describes separately operations of the three types of the processing mentioned above.

Figure 15:
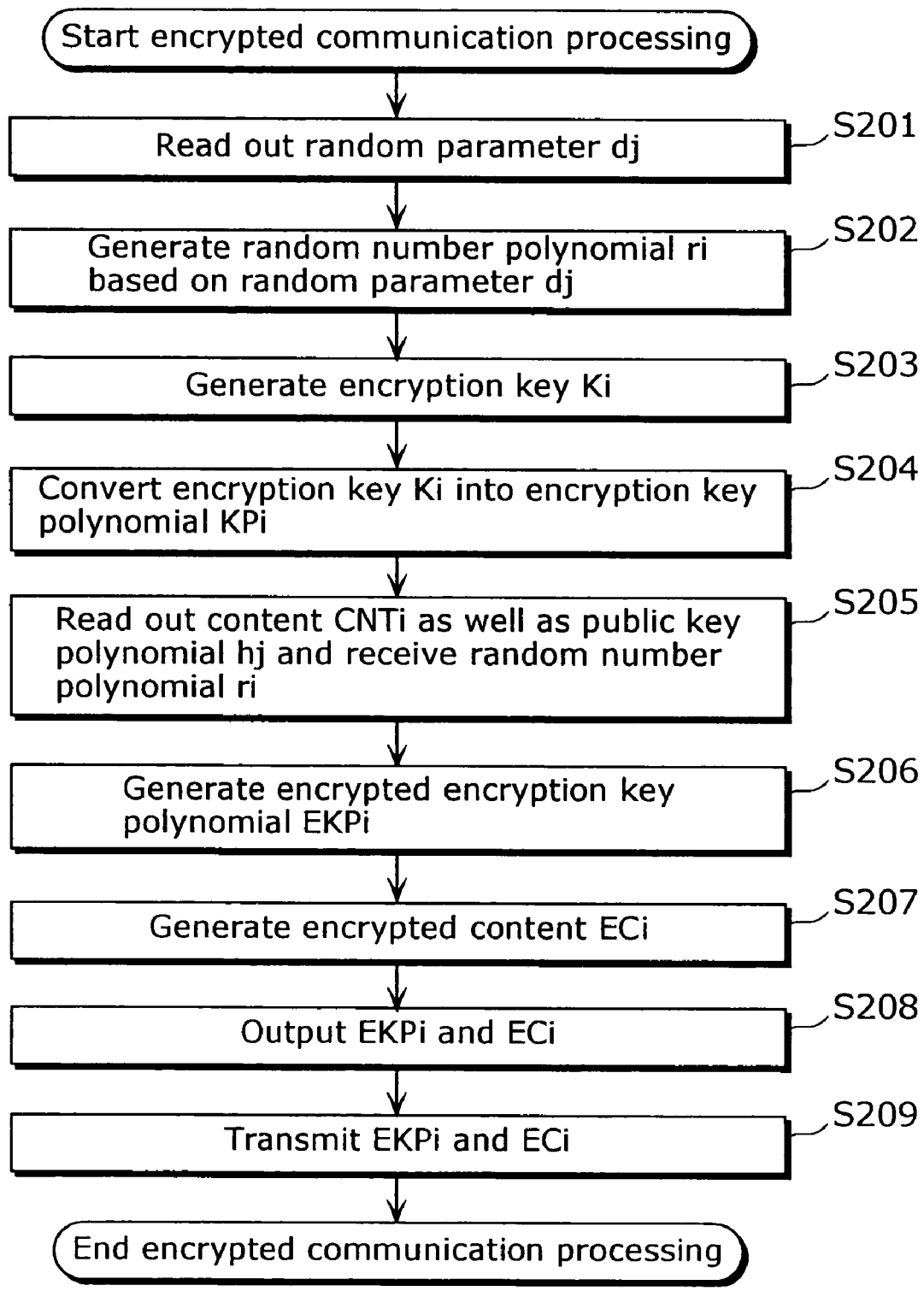
FIG. 15 is a flowchart showing a sequence of encrypted communication processing performed by the content server 210 according to the second embodiment of the present invention.

Firstly, the encrypted communication processing performed by the content server 210 is described with reference to the flowchart shown in FIG. 15.

As a start, the random number generation unit 215 reads out from the parameter storage unit 212 the random parameter dj of the receiving apparatus 230 (Step S201) and generates at random the random number polynomial ri ($1 \leq i \leq k$) where "dj" coefficients equal 1, another "dj" coefficients equal −1 and other coefficients equal 0, based on the random parameter dj that is read out from the parameter storage unit 212 and outputs the generated random number polynomial ri ($1 \leq i \leq k$) to the encryption unit 217 (Step S202). The method of generating the random number polynomial ri is as described with reference to FIG. 1.

Then, the encryption key generation unit 216 generates at random the encryption key Ki ($1 \leq i \leq k$) and outputs it to the encryption unit 217 (Step S203). The encryption key Ki may be generated using the rand function that is a standard library function based on the Programming Language C.

The encryption unit 217 receives the encryption key Ki ($1 \leq i \leq k$) from the encryption key generation unit 216 and converts it into an encryption key polynomial KPi ($1 \leq i \leq k$) so that it can be encrypted using the NTRU™ encryption (Step S204). The encryption unit 217 then reads out the content CNTi ($1 \leq i \leq k$) and the public key polynomial hj of the receiving apparatus 230 respectively from the content storage unit 211 and the parameter storage unit 212. Furthermore, the encryption unit 217 receives the random number polynomial ri ($1 \leq i \leq k$) from the random number generation unit 215 (Step S205), performs the encryption algorithm E based on the NTRU™ encryption to the converted encryption key polynomial EKPi=E (KPi, ri, hj) ($1 \leq i \leq k$), using the random number polynomial ri ($1 \leq i \leq k$) and the public key polynomial hj and generates the encrypted encryption key polynomial EKPi=E (KPi, ri, hj) ($1 \leq i \leq k$) (Step S206). The encryption unit 217 receives the content CNTi ($1 \leq i \leq k$) from the content storage unit 211, and then, performs the shared key encryption algorithm Sym to the content CNTi ($1 \leq i \leq k$) using the encryption key Ki ($1 \leq i \leq k$) and generates the encrypted content ECi=Sym (CNTi, Ki) ($1 \leq i \leq k$) (Step S207). The encryption unit 217 then outputs to the transmission unit 218 the encrypted encryption key polynomial EKPi ($1 \leq i \leq k$) and the encrypted content ECi ($1 \leq i \leq k$) (Step S208).

The transmission unit 218 transmits to the receiving apparatus 230 the received encrypted encryption key polynomial EKPi ($1 \leq i \leq k$) and content ECi ($1 \leq i \leq k$) via the Internet 240 and terminates the processing (Step S209).

Figure 16:
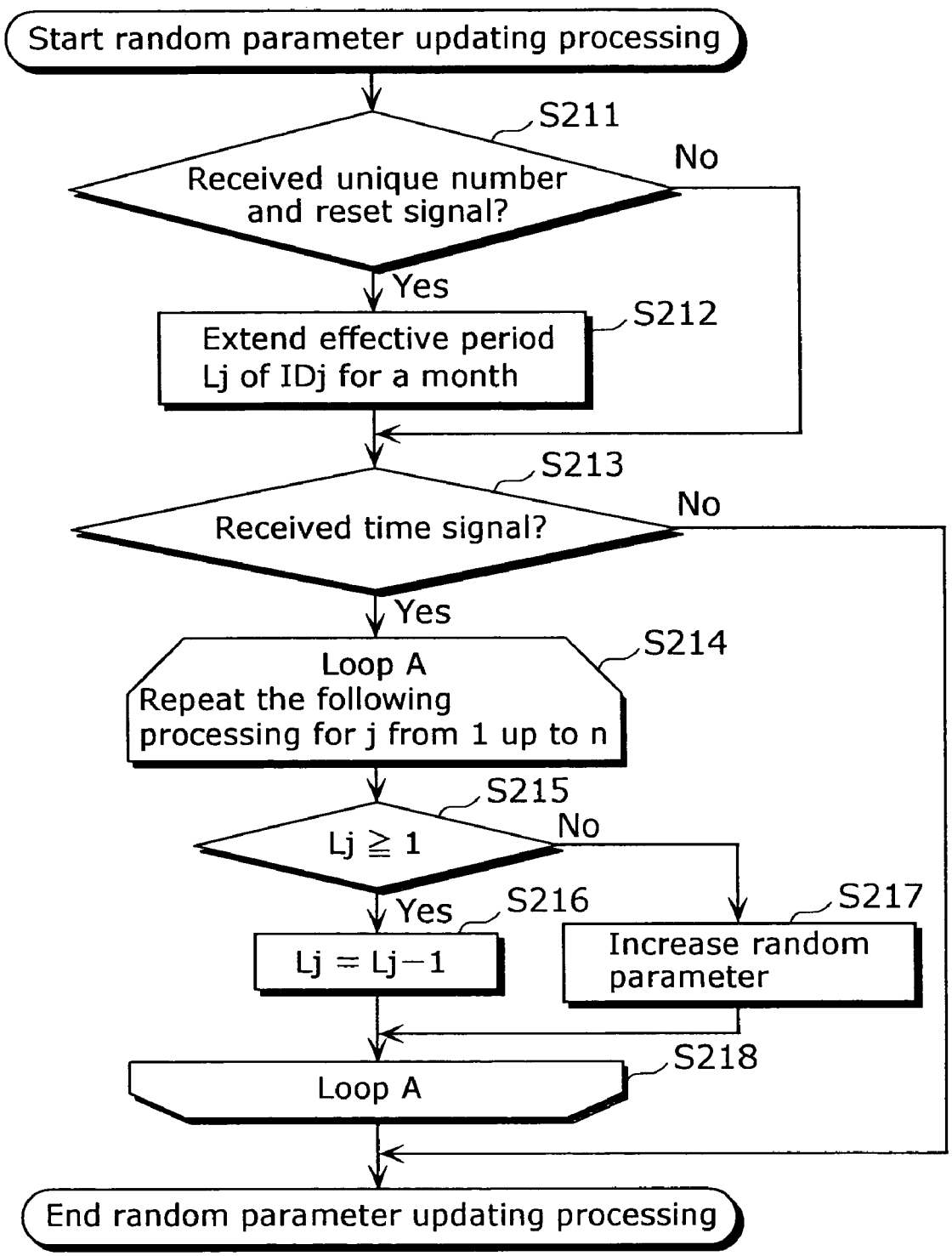
FIG. 16 is a flowchart showing a sequence of processing for updating a random parameter, operated by the content server 210 according to the second embodiment of the present invention.

Next, the random parameter updating processing performed by the content server 210 is described with reference to the flowchart shown in FIG. 16.

When receiving the unique number IDj and the reset signal from the key server 220 (Yes in Step S211), the parameter control unit 214 extends an effective period of content use Lj for the receiving apparatus 230 specified by the unique number IDj for another month (Step S212). The reset signal is transmitted from the key server 220 when the receiving apparatus 230 pays the charge for the content use.

The parameter control unit 214, receiving the time signal from the timer unit 213 (Yes in Step S213), examines whether or not the effective period of content use Lj for the receiving apparatus 230 specified by the unique number IDj is more than or equal to one day (Step S215). When the effective period of content use Lj is extended for more than or equal to one day (Yes in Step S215), the parameter control unit 214 decrements the effective period of content use Lj by 1 (Step 216). In contrast, the value of the random parameter stays the same. When the effective period of content use Lj is less than or equal to 0 (No in Step S215), the parameter control unit 214 increases the random parameter dj by 1 (Step S217). The above processing is performed for all the receiving apparatuses 230 specified by the unique number IDj and then the processing is terminated (Steps S214~S218).

Thus, by increasing the random parameter dj of the receiving apparatus 230 whose effective period for content use is invalid, the probability of the decryption error in decrypting the content CNT increases day by day.

Figure 17:
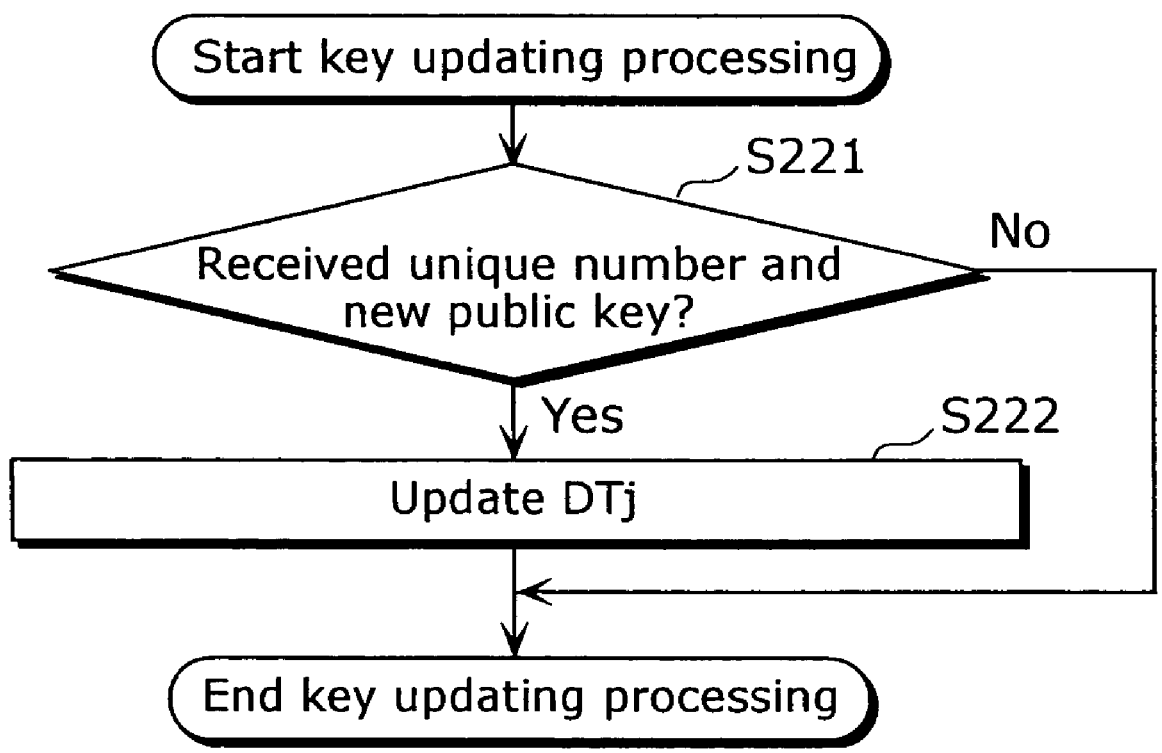
FIG. 17 is a flowchart showing a sequence of processing for updating a public key, performed by the content server 210 according to the second embodiment of the present invention.

Next, the following describes the public key updating processing performed by the content server 210, with reference to the flowchart shown in FIG. 17.

The key updating unit 219 receives, from the key server 220 via the dedicated connection 250, the unique number IDj and the public key polynomial hj' ($1 \leq j \leq n$) of the receiving apparatus 230 (Yes in Step S221), updates the data DTj=(IDj, hj, dj) stored in the parameter storage unit 212 to data DTj'=(IDj, hj', dj') and terminates the processing. Here, dj' is the initial value of the random parameter dj defined as dj'=18 (Step S222). The key updating unit 219 does not perform any processing unless it receives the unique number IDj and the public key polynomial hj' ($1 \leq j \leq n$) of the receiving apparatus 230 (No in Step S221).

Figure 18:
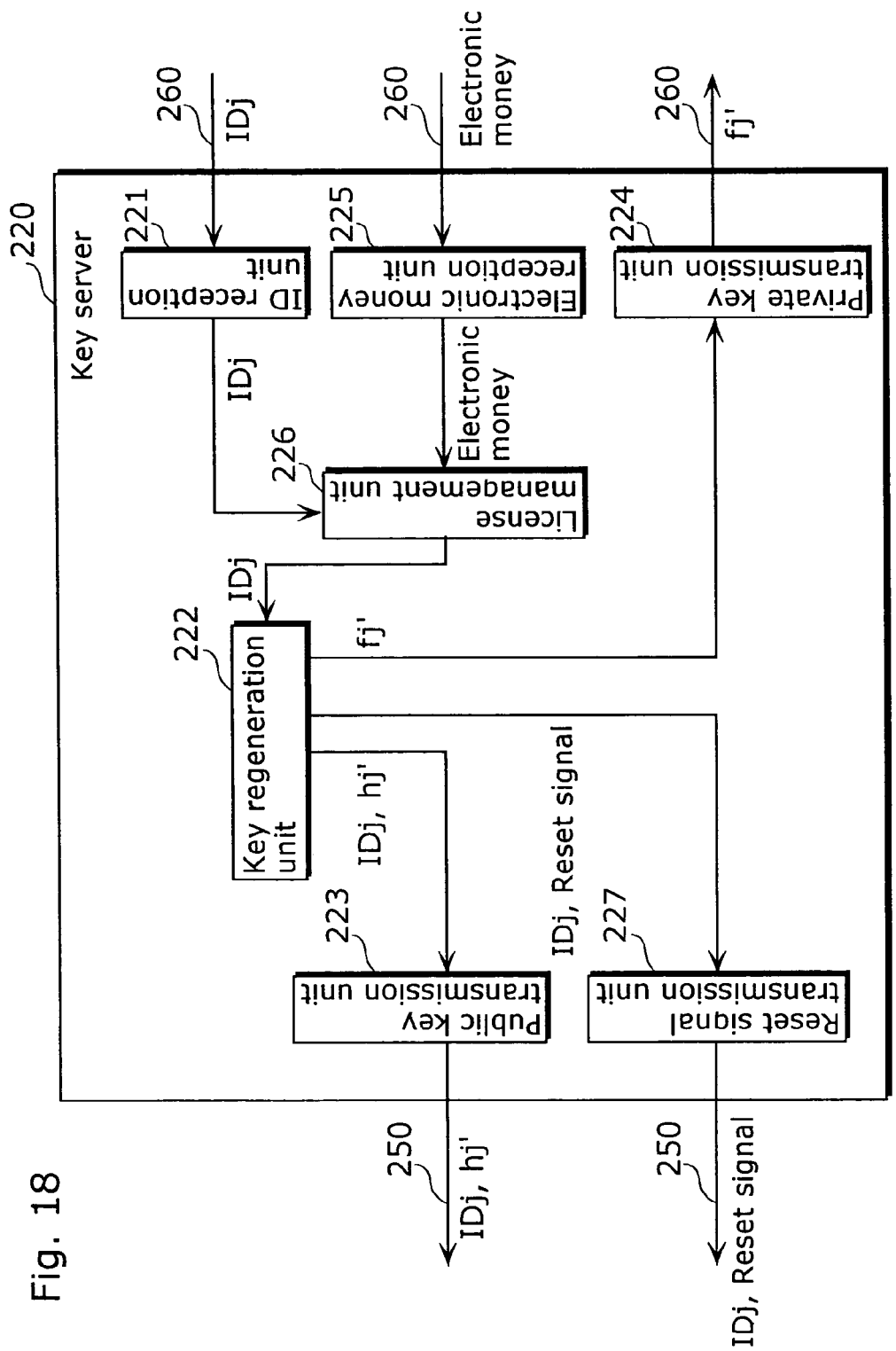
FIG. 18 is a diagram showing a structure of a key server 220 according to the second embodiment of the present invention.

The key server 220 includes an ID reception unit 221, a key regeneration unit 222, a public key transmission unit 223, a private key transmission unit 224, an electronic money reception unit 225, a license management unit 226 and a reset signal transmission unit 227, as shown in FIG. 18.

The ID reception unit 221 receives, from the receiving apparatus 230 via the telephone circuit 260, the unique number IDj ($1 \leq j \leq n$) of the receiving apparatus 230 and outputs it to the license management unit 226.

The electronic money reception unit 225 receives the electronic money from the receiving apparatus 230 via the telephone circuit 260 and outputs the received electronic money to the license management unit 226. The electronic money here means electronic cash that circulates on the network.

The license management unit 226 receives the unique number IDj of the receiving apparatus 230 and the electronic money respectively from the ID reception unit 221 and the electronic money reception unit 225. The license management unit 226 then checks whether or not the received unique number IDj and the electronic money are transmitted by the receiving apparatus 230 which is under a contract with a content service provider or whether or not the required amount is paid or the like, based on the unique number IDj and the electronic money. When no problems are found in the checking result, the license management unit 226 outputs the unique number IDj of the receiving apparatus 230 to the key regeneration unit 222.

The key regeneration unit 222, receiving the unique number IDj from the license management unit 226, generates the private key polynomial fj' and the public key polynomial hj' based on the NTRU™ encryption method. The key regeneration unit 222 outputs the received unique number IDj as well as the generated public key polynomial hj' to the public key transmission unit 223 and also the generated private key polynomial fj' to the private key transmission unit 224. At the same time, the key regeneration unit 222 outputs the unique number IDj and the reset signal to the reset signal transmission unit 227.

The public key transmission unit 223, receiving the unique number IDj and the public key polynomial hj' from the key regeneration unit 222, transmits them to the content server 210 via the dedicated connection 250.

The reset signal transmission unit 227, receiving the unique number IDj and the reset signal from the key regeneration unit 222, transmits them to the content server 210 via the dedicated connection 250.

The private key transmission unit 224, receiving the private key polynomial fj' from the key regeneration unit 222, transmits it to the receiving apparatus 230 via the telephone circuit 260.

Figure 19:
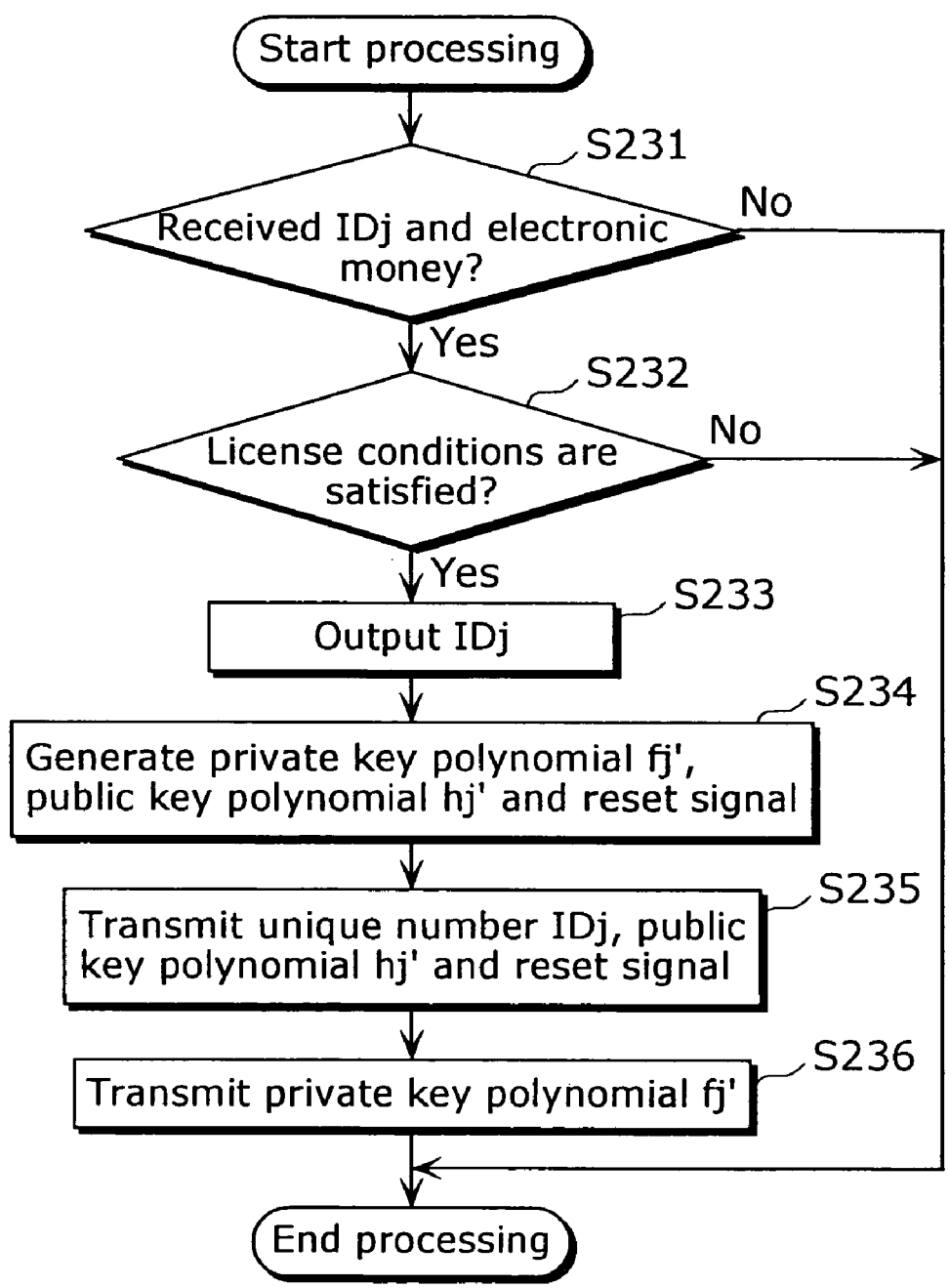
FIG. 19 is a flowchart showing a sequence of processing performed by the key server 220 according to the second embodiment of the present invention.
Figure 20:
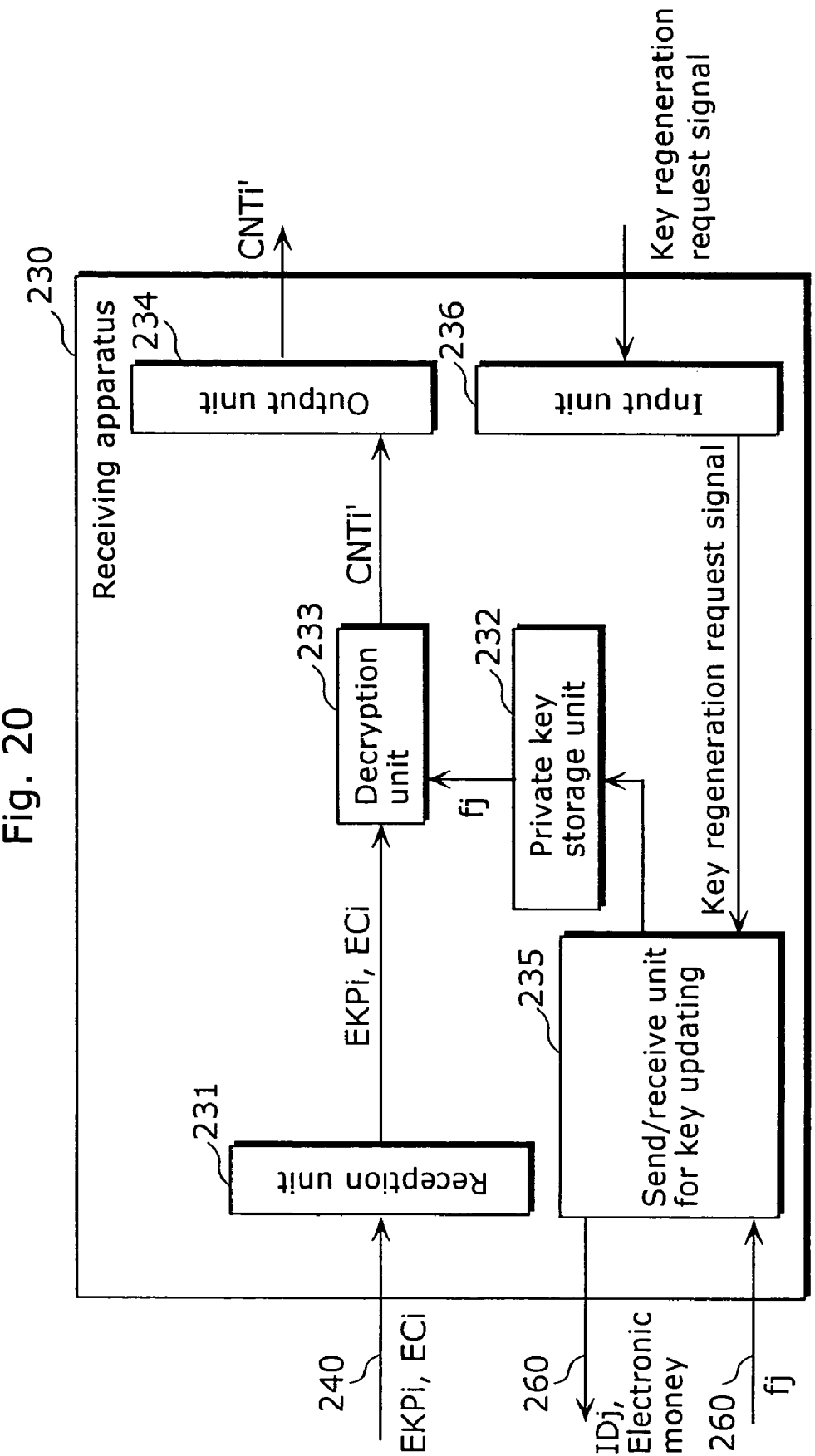
FIG. 20 is a diagram showing a structure of the receiving apparatus 230 according to the second embodiment of the present invention.

The following describes the operation of the key server 220 mentioned above, with reference to the flowchart shown in FIG. 19.

When the ID reception unit 221 and the electronic money reception unit 225 receive respectively the unique number IDj ($1 \leq j \leq n$) of the receiving apparatus 230 and the electronic money (Yes in Step S231), the license management unit 226 checks whether or not they are sent from the receiving apparatus 230 which is under the contract with the content service provider or checks the license conditions such as whether or not the required amount is paid. When the license conditions are satisfied (Yes in Step S232), the license management unit 226 outputs the received unique number IDj to the key regeneration unit 222 (Step S233).

The key regeneration unit 222 receives the unique number IDj from the ID reception unit 221 and generates the private key polynomial fj' and the public key polynomial hj' based on the NTRU™ encryption method (Step S234).

The public key transmission unit 223 receives the unique number IDj and the public key polynomial hj' from the key regeneration unit 222 and transmits them to the content server 210 via the dedicated connection 250. The reset signal transmission unit 227 receives the unique number IDj and the reset signal from the key regeneration unit 222 and transmits them to the content server 210 via the dedicated connection 250 (Step S235).

The private key transmission unit 224 receives the private key polynomial fj' from the key regeneration unit 222 and transmits it to the receiving apparatus 230 via the telephone circuit 260 (Step S236).

The receiving apparatus 230 includes a reception unit 231, a private key storage unit 232, a decryption unit 233, an output unit 234, a transmission for key updating 235 and an input unit 236.

The reception unit 231 receives the encrypted encryption key polynomial EKPi ($1 \leq i \leq k$) and the encrypted content ECi ($1 \leq i \leq k$) from the content server 210 via the Internet 240 and outputs them to the decryption unit 233.

The private key storage unit 232 stores the private key polynomial fj of the receiving apparatus 230.

The decryption unit 233 has in advance the decryption algorithm D based on the NTRU™ encryption method which is an inverse conversion of the encryption algorithm E included in the encryption unit 217 as well as the shared key encryption algorithm Sym included in the encryption unit 217.

The decryption unit 233 receives the encrypted encryption key polynomial EKPi ($1 \leq i \leq k$) and the encrypted content ECi ($1 \leq i \leq k$) from the reception unit 231 and reads out the private key polynomial fj of the receiving apparatus 230 from the private key storage unit 232. The decryption unit 233 performs the decryption algorithm D to the encrypted key encryption polynomial EKPi ($1 \leq i \leq k$) with the use of the private key polynomial fj and generates a decrypted encryption key polynomial KPi'=D (EKPi, fj) ($1 \leq i \leq k$).

The decryption unit 233 converts the decrypted encryption key polynomial KPi ($1 \leq i \leq k$) into decrypted encryption key Ki' ($1 \leq i \leq k$) using the inverse conversion of the conversion performed by the encryption unit 217 in the content server 210.

The decryption unit 233 performs the shared key encryption algorithm Sym to the encrypted content ECi ($1 \leq i \leq k$) with the use of the decrypted encryption key Ki' ($1 \leq i \leq k$) and generates decrypted content CNTi'=Sym (ECi, Ki') ($1 \leq i \leq k$). The decryption unit 233 then outputs the generated content CNTi' ($1 \leq i \leq k$) to the output unit 234.

The output unit 234 includes, for instance, a monitor or a speaker, which are not shown in the diagram, and outputs the inputted decrypted content CNTi' ($1 \leq i \leq k$) to the exterior.

The monitor outputs video whereas the speaker outputs audio, to the exterior, respectively obtained from the MPEG2 data included in the decrypted content CNTi' ($1 \leq i \leq k$).

When receiving the key regeneration request signal via the input unit 236, the transmission for key updating unit 235 transmits, to the key server 220 via the telephone circuit 260, the unique number IDj of the receiving apparatus 230 and the electronic money equivalent to the amount specified in the contract with the content service provider. The transmission for key updating unit 235 also receives the private key polynomial fj' from the key server 220 via the telephone circuit 260 and updates it to the received private key polynomial fj'.

The user j operating the receiving apparatus 230 can input, to the input unit 236, the key regeneration request signal instructing the regeneration of the public key polynomial hj and the private key polynomial fj of the receiving apparatus 230. The key regeneration request signal is a signal to be inputted by the user in order to regenerate the public key polynomial hj and the private key polynomial fj for the reason such that the outputted decrypted content CNTi' ($1 \leq i \leq k$) cannot be obtained correctly or the like.

The input unit 236 outputs the key regeneration request signal inputted from outside to the transmission for key updating unit 235.

The receiving apparatus 230 as described above performs asynchronously in parallel the decryption processing and the key updating processing described below (any order is possible).

The following describes separately the operations of the decryption processing and the key updating processing performed by the receiving apparatus 230.

Figure 21:
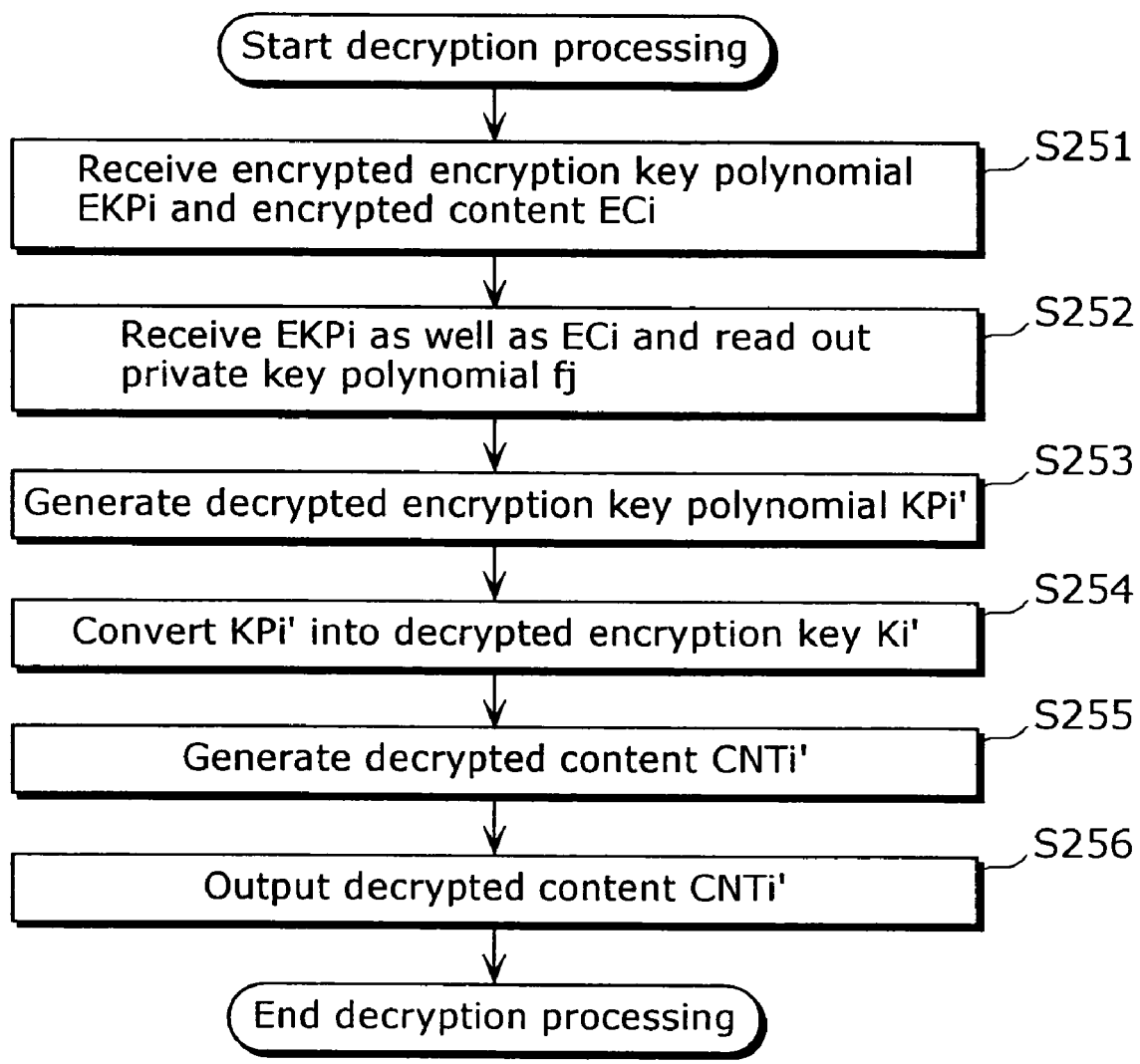
FIG. 21 is a flowchart showing a sequence of decryption processing performed by the receiving apparatus 230 according to the second embodiment of the present invention.

Firstly the decryption processing is explained with reference to the flowchart shown in FIG. 21.

The reception unit 231 receives the encrypted encryption key polynomial EKPi ($1 \leq i \leq k$) and the encrypted content ECi ($1 \leq i \leq k$) from the content server 210 via the Internet 240 and outputs them to the decryption unit 233 (Step S251).

The decryption unit 233 receives the encrypted encryption key polynomial EKPi ($1 \leq i \leq k$) as well as the encrypted content ECi ($1 \leq i \leq k$) from the reception unit 231 and reads out the private key polynomial fj of the receiving apparatus 230 from the private key storage unit 232 (Step S252). The decryption unit 233 performs the decryption algorithm D to the encrypted encryption key polynomial EKPi ($1 \leq i \leq k$) using the private key polynomial fj and generates decrypted encryption key polynomial KPi'=D (EKPi, fj) ($1 \leq i \leq k$) (Step S253).

The decryption unit 233 then converts the decrypted encryption key polynomial KPi' ($1 \leq i \leq k$) into decrypted encryption key Ki' ($1 \leq i \leq k$) using the inverse conversion of the conversion performed by the encryption unit 217 in the content server 210 (Step S254).

The decryption unit 233 then performs the shared key encryption algorithm Sym to the encrypted content ECi ($1 \leq i \leq k$) using the decrypted encryption key Ki' ($1 \leq i \leq k$), generates decrypted content CNTi'=Sym (ECi, Ki') ($1 \leq i \leq k$) and outputs it to the output unit 234 (Step S255).

The output unit 234 outputs to the exterior respectively the video and the audio obtained from the MPEG2 data included in the decrypted content CNTi' ($1 \leq i \leq k$) and terminates the processing (Step S256).

Figure 22:
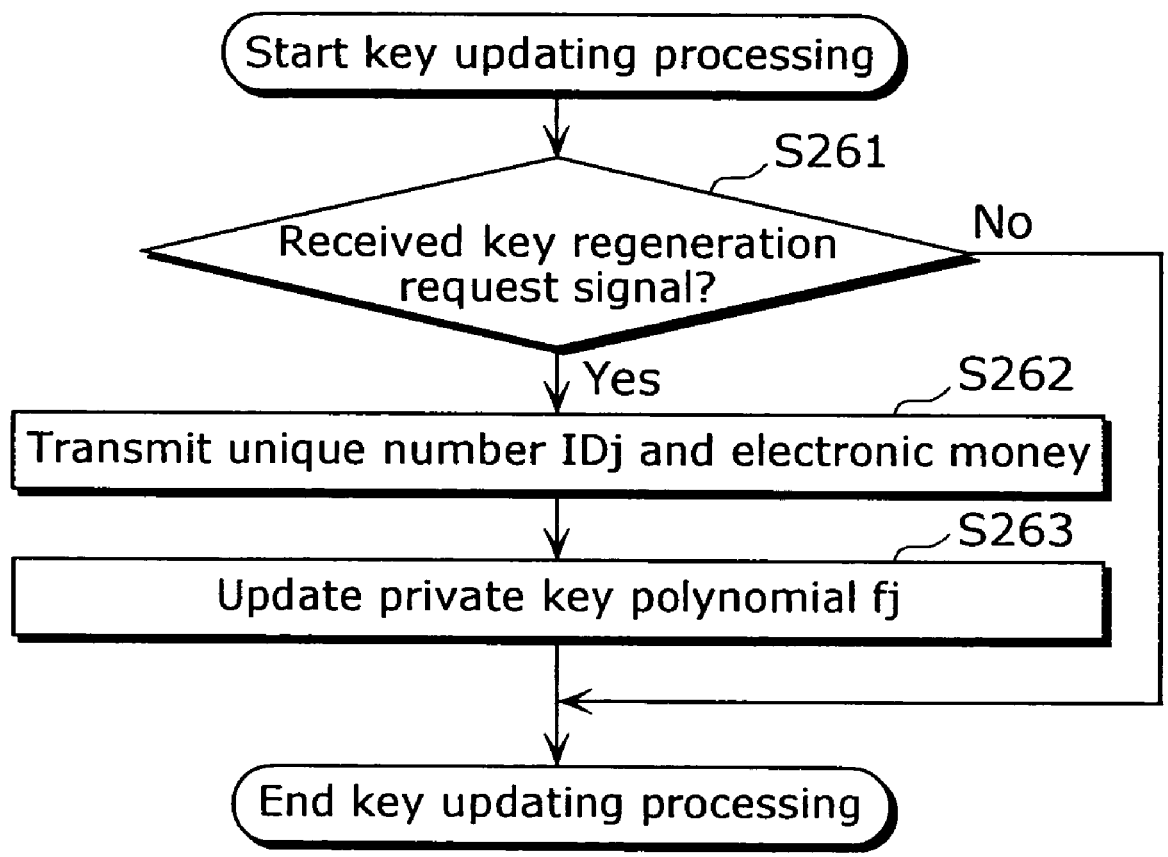
FIG. 22 is a flowchart showing a sequence of processing for updating a key, performed by the receiving apparatus 230 according to the second embodiment of the present invention.

Next, the following describes the key updating processing performed by the receiving apparatus 230, with reference to the flowchart shown in FIG. 22.

Firstly, when receiving the key regeneration request signal via the input unit 236 (Yes in Step S261), the transmission for key updating unit 235 transmits to the key server 220 via the telephone circuit 260 the unique number IDj of the receiving apparatus 230 and the electronic money equivalent to the amount specified in the contract signed with the content service provider (Step S262). The transmission for key updating unit 235 then receives the private key polynomial fj' from the key server via the telephone circuit 260, updates the private key polynomial fj stored in the private key storage unit 232 to the received private key polynomial fj' and terminates the processing (Step S263).

The following describes the whole operation of the encryption system 2 according to the second embodiment, focusing mainly on the differences from the encryption system 1.

The content server 210 firstly stores the unique number IDj, the public key polynomial hj and the random parameter dj of the receiving apparatus 230 as data DTj=(IDj, hj, dj) in the parameter storage unit 212. The initial value of the dj is defined as dj=18.

The content server 210 then encrypts the content CNTi ($1 \leq i \leq k$) with the use of the encryption key Ki ($1 \leq i \leq k$) based on the shared encryption key encryption and generates the encrypted content ECi ($1 \leq i = \leq k$), according to the encrypted communication processing performed by the content server 210. The content server 210 also encrypts the encryption key polynomial KPi ($1 \leq i \leq k$) converted from the encryption key Ki ($1 \leq i \leq k$) based on the NTRU™ encryption and generates the encrypted encryption key polynomial EKPi ($1 \leq i \leq k$). The content server 210 transmits the encrypted content ECi ($1 \leq i \leq k$) together with the encrypted encryption key polynomial EKPi ($1 \leq i \leq k$) to the receiving apparatus 230 via the Internet 240. On the other hand, the receiving apparatus 230 decrypts the received encrypted encryption key polynomial EKPi ($1 \leq i \leq k$) and generates the decrypted encryption key polynomial KPi' ($1 \leq i \leq k$), according to the decryption processing. The receiving apparatus 230 decrypts the encrypted content ECi ($1 \leq i \leq k$) using the converted decrypted encryption key Ki' ($1 \leq i \leq k$) and outputs the decrypted content CNTi' ($1 \leq i = \leq k$).

In the content server 210, the parameter control unit 214 increases the values of all the random parameters dj ($1 \leq j \leq n$) stored in the parameter storage unit 212 by 1, according to the time signal generated every day by the timer unit 213. Namely all the values of the random parameters dj stored in the parameter storage unit 212 increase ($1 \leq j \leq n$) every day.

Therefore, when the encrypted communication processing is performed continuously by the content server 210, the number of the coefficients indicating 1 (the number of the coefficients indicating −1) in the random number polynomial ri ($1 \leq i \leq k$) used for the generation of the encrypted encryption key polynomial EKPi ($1 \leq i \leq k$) increases every day.

However, as for the receiving apparatus 230 that is under the contract with the content service provider to receive content service, the value of the random parameter dj ($1 \leq i \leq k$) is not updated until the contract is completed. Therefore, the number of the coefficients indicating 1 (the number of the coefficients indicating −1) in the random number polynomial ri ($1 \leq i \leq k$) stays as 18.

Figure 23A:
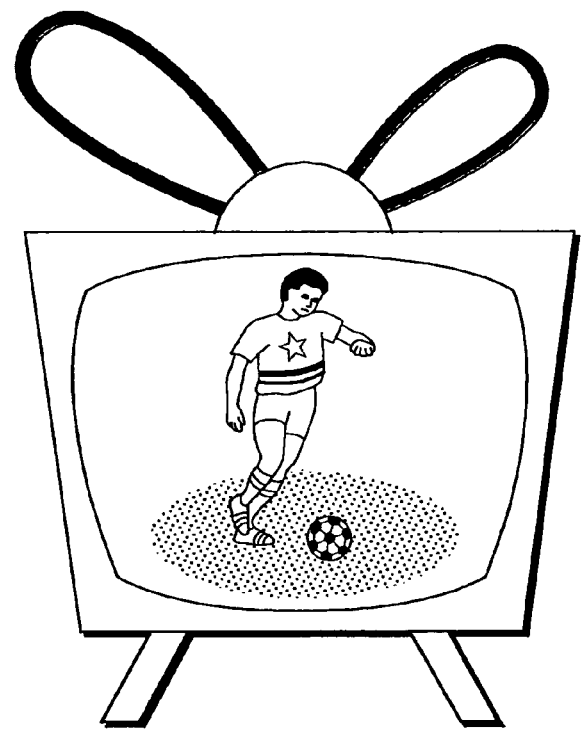
FIG. 23A is a diagram showing a result of correctly decrypting contents.
Figure 23B:
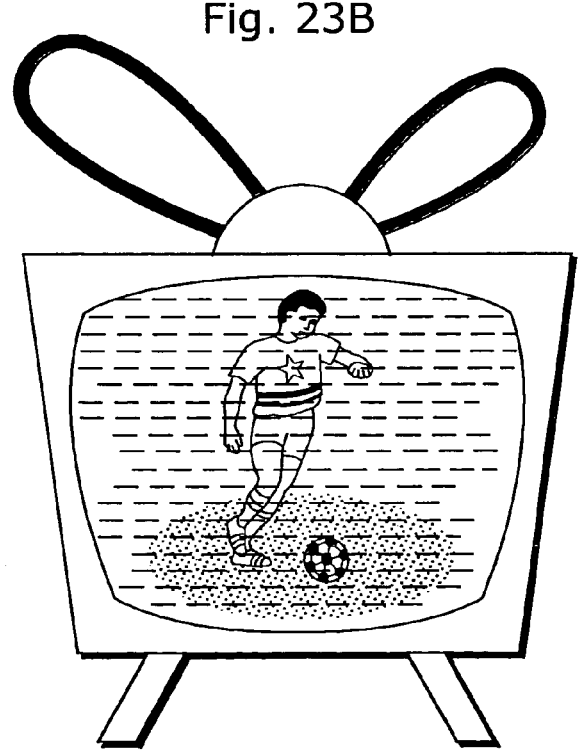
FIG. 23B is a diagram showing a result of mistakenly decrypting the contents.

FIG. 11 shows a result of measuring the probability of the decryption error based on the NTRU™ encryption method where N=167, using the random number polynomial r where "d" coefficients equal 1, another "d" coefficients equal −1, for the value of the random parameter d, and other coefficients equal 0. According to the result, with the initial value of the random parameter dj defined as dj=18, almost no decryption errors occur in decrypting the encrypted encryption key polynomial EKPi ($1 \leq i \leq k$) generated by the content server 210 (the receiving apparatus 230 can obtain, from the encrypted encryption key polynomial EKPi ($1 \leq i \leq k$), the decrypted encryption key Ki' equivalent to the encryption key Ki and decrypt correctly the content CNTi as shown in FIG. 23A). On the other hand, the random parameter dj increases gradually day by day as time goes by, therefore, the probability of the decryption error increases gradually in decrypting the encrypted encryption key polynomial EKPi ($1 \leq i \leq k$) generated by the content server 210 (the receiving apparatus 230 cannot gradually obtain, from the received encrypted encryption key polynomial EKPi ($1 \leq i \leq k$), the decrypted encryption key Ki' equivalent to the encrypted encryption key Ki and thereby cannot decrypt gradually the content CNTi as shown in FIG. 23B).

When the probability that the receiving apparatus 230 decrypts correctly the content CNT ($1 \leq i \leq k$) increases and practical encrypted communications cannot be performed, the user j operating the receiving apparatus 230 can input to the input unit 236 the key regeneration request signal instructing the regeneration of the public key polynomial hj and the private key polynomial fj of the receiving apparatus 230 by performing the key updating processing. At this point, the electronic money is paid toward the key server 220 managing the content service provider. The key server 220 updates the random parameter dj stored in the parameter storage unit 212 in the content server 210 to the initial value dj' defined as dj'=18, therefore, the decryption error decreases to the initial state so that the receiving apparatus 230 can perform encrypted communications practically for the period specified in the contract.

With the encryption system 2 according to the second embodiment as described above, the content CNT that is digital data is divided at every certain time and the content CNTi ($1 \leq i \leq k$) is distributed to the receiving apparatus 230. Generally, in the case of digital data such as MPEG2, the noise is generated in a moving picture or audio unless the content CNTi can be obtained due to the decryption error. Consequently, the probability of the decryption error increases and such noise increases gradually as time goes by. As a result, the content service provider can let the user use the content at the level where the noise occurs without any practical problems for a month but prevents the user's practical usage of the content as long as the user neither pays the charges nor performs the key updating when the probability of the decryption error increases after one month, which gives an increase to the level of noise occurrence. Namely, the encryption system 2 is applicable to the content delivery with a limited period.

Generally, in the case of encrypting the large content CNTi ($1 \leq i \leq k$) such as MPEG2, the content CNTi needs to be divided depending on the input bit length used for the NTRU™ encryption and the encryption processing based on the NTRU™ encryption has to be repeated for several times when the NTRU™ encryption is attempted for every content CNTi. In this case, however, the encryption is performed for the encryption key Ki based on the NTRU™ encryption and the large content CNTi is encrypted based on the shared key encryption whose processing speed is faster than that of the public key encryption. Therefore, the encryption system 2 which realizes high-speed processing is applicable to the content delivery.

Also, the key server 220 is used for updating the key so that the content service provider can grasp how often the user has updated the key via the key server 220. The content service provider can therefore charge the fees for the content use to the user.

The same effects as obtained in the first embodiment can be gained.

The embodiments described above are the examples for the embodiment of the present invention, therefore, the present invention is not limited to these embodiments and it will be obvious that the embodiments of the invention may be varied in many ways. Such variations are not to be regarded as a departure from the spirit and scope of the invention and all such modifications as would be obvious to one skilled in the art are intended for inclusion within the scope of the following claims. The following cases are also included in the present invention.

The parameter used for the NTRU™ encryption employed in the above-mentioned encryption systems is not limited to the definition of N=167 and other value may be used in stead.

The parameter control unit 114 or 214 may increase the random parameter every arbitrary period or may define arbitrary increases for the parameter under the condition that the random parameter increases gradually as a certain period of time passes, other than increasing the random parameter by 1 every day.

In addition, the parameter control unit 114 or 214 may increase the random parameter either every time the random parameter is read out or according to the number of times the random parameter is read out instead of according to the elapsing time. Thus, the probability of the decryption error can be controlled according to the increase in the number of times for encryption. This can therefore prevent the continuous decryption of the encrypted text, attempted by the receiving apparatus operated by the outsider having the disclosed private key. In this way, it is possible to prevent the disadvantage on the sender's side when the private key is disclosed in the case of transmitting digital works such as music.

Also, it is possible to urge the receiving apparatus or the user operating the receiving apparatus to update the key. Thus, the content delivery service with limited access as well as the one with limited period of use can be provided.

It is explained in the above embodiments that the key regeneration request signal is inputted from outside via the input unit 126 or 236. The receiving apparatus 120 or 230, however, may detect the decryption error in one way or another and the key regeneration request signal may be inputted automatically according to the detected decryption error.

This can be realized, for example, in a case where the decryption unit 233 in the second embodiment judges whether or not the decrypted content CNTi' complies with the format of the MPEG2, detects the decryption error and inputs the key regeneration request signal in the input unit 236 when the probability of the decryption error increases.

The format may be defined in advance, for instance, by defining the coefficient equivalent to the first ten dimensions in the plaintext polynomial KPi ($1 \leq i \leq k$) as 1 or the like. It can also be realized in a case where the decryption unit 123 or 223 judges whether or not the decrypted text polynomial m' and the decrypted encryption key polynomial KPi' comply with the defined format, detects the decryption error and inputs the key regeneration request signal in the input unit 126 or 236 when the probability of the decryption error increases.

The key regeneration request signal may be inputted when the error exceeds the predetermined degree within half an hour.

In the second embodiment, the Internet 240, the dedicated connection 250 and the telephone circuit 260 may use either the same transmission line as used in the embodiment or other transmission line such as satellite communication network. The private key fj is transmitted via a transmission line between the key server 220 and the receiving apparatus 230, therefore, the encrypted communications may be performed for the enhancement of the security.

Other shared key encryption methods such as AES (Advanced Encryption Standard) encryption or the like may be employed as the shared key encryption algorithm Sym in the second embodiment.

In the second embodiment, the content CNTi ($1 \leq i \leq k$) is not limited to the MPEG2 and may be digital data that can be replayed by WindowsMedia®Player or RealPlayer® and the format of the data can be varied.

In the second embodiment, the content server 210 and the key server 220 may be included in the same apparatus.

The NTRU™ encryption is used in the first and the second embodiments; however, the NTRU™ encryption based on EESS (Efficient Embedded Security Standard) may be used instead. As for the NTRU™ encryption based on the EESS method, the detail is explained in "EESS: Consortium for Efficient Embedded Security, Efficient Embedded Security Standards #1: Implementation Aspects of NTRUEncrypt and NTRUSign. Version 2.0,". Therefore, the detailed description is not repeated here, but the brief explanation follows.

In the NTRU™ encryption based on the EESS method, the random number polynomial r is calculated using either the polynomial in which "d" coefficients equal 1 and the (N–d) number coefficients equal 0 or multiple polynomials as such. Similarly as in the NTRU™ encryption described above, the probability of the decryption error increases as the value of the random parameter d increases. Therefore, the same effects can be obtained in employing the NTRU™ encryption based on the EESS method instead of using the NTRU™ encryption method which is not based on the EESS method.

The electronic money is used for paying the charge of content use in the second embodiment, however, the payment by cash, if such method can be certainly proved, is possible and the receipt or the like may be transmitted electronically to the key server.

In the second embodiment, the updating of the key is performed based on the fact that the key server receives the electronic money, however, the key may be updated by other component. For example, the key server may inform of the amount of charge to the receiving apparatus or the user when receiving the key regeneration request signal from the receiving apparatus or the user. After that, the receiving apparatus or the user transmits information aiming to "approve of being charged" to the key server so that the key updating is performed when the key server receives the information.

The present invention may be defined as the methods as described above. It may be a computer program for realizing these methods using a computer or a digital signal consisting of such program.

According to the present invention, the computer program or the digital signal may be a computer-readable storage medium such as a semiconductor memory, a hard disk drive, a CD-ROM (Compact Disc-Read Only Memory), a DVD-ROM (Digital Versatile Disc-Read Only Memory) and a DVD-RAM (Digital Versatile Disc-Random Access Memory) or the like.

The aforementioned embodiments and variations may be combined.

INDUSTRIAL APPLICABILITY

Thus, the encryption system according to the present invention is applicable as an encryption system which can urge the receiving apparatus or the user operating it to update the key, especially as an encryption system for distributing content data.

The invention claimed is:

1. An encryption apparatus for generating an encrypted text by encrypting a plaintext, said encryption apparatus comprising:
    a storage unit operable to store an encryption key and a parameter, the parameter being adapted to a decryption apparatus and being used to change a probability of decryption error in decrypting the encrypted text;
    an encryption unit operable to generate the encrypted text from the plaintext, using the encryption key and the parameter stored in said storage unit, according to an encryption algorithm which changes the probability of the decryption error in decrypting the encrypted text depending on a value of the parameter; and
    an updating unit operable to update the parameter stored in said storage unit,
    wherein the parameter stored in said storage unit indicates the number of terms whose coefficients indicate 1 in a random number polynomial based on an NTRU encryption method, and
    wherein said updating unit increases the number of the terms whose coefficients indicate 1 every passage of a predetermined amount of time.

2. The encryption apparatus according to claim 1,
    wherein said encryption unit generates the encrypted text using the encryption algorithm based on the NTRU encryption method.

3. The encryption apparatus according to claim 1, further comprising:
    an encryption key updating unit operable to receive, from the decryption apparatus, a request to update the encryption key, and to update the encryption key in response to the updating request; and
    an initialization unit operable to receive, from the decryption apparatus, a request to update the number of the terms whose coefficients indicate 1 in the random number polynomial, and set, in response to the updating request, the number of the terms whose coefficients indicate 1 in the random number polynomial to an initial value which decreases the probability of the decryption error to a value less than or equal to a predetermined value.

4. The encryption apparatus according to claim 3,
    wherein said initialization unit sets the number of the terms whose coefficients indicate 1 in the random number polynomial to the initial value only when the decryption apparatus has paid a predetermined amount.

5. The encryption apparatus according to claim 1,
    wherein said updating unit updates the parameter stored in said storage unit so that the probability of the decryption error in decrypting the encrypted text increases with a passage of time.

6. The encryption apparatus according to claim 1,
    wherein said encryption unit generates the encrypted text using an encryption algorithm based on the NTRU encryption method.

7. The encryption apparatus according to claim 6,
    wherein said encryption unit generates the encrypted text using the encryption algorithm used for the NTRU encryption method based on an EESS (Efficient Embedded Security Standard) method.

8. The encryption apparatus according to claim 1, further comprising:
    an encryption key updating unit operable to receive, from the decryption apparatus, a request to update the encryption key, and to update the encryption key in response to the updating request; and a parameter initialization unit operable to receive, from the decryption unit, a request to update the parameter, and set, in response to the initialization request, a value of the parameter to an initial value which decreases the probability of the decryption error to a value less than or equal to a predetermined value.

9. An encryption system comprising an encryption apparatus for generating an encrypted text by encrypting a plaintext and a decryption apparatus for generating a decrypted text by decrypting the encrypted text, wherein the encryption apparatus includes:

a storage unit operable to store an encryption key and a parameter, the parameter being adapted to the decryption apparatus and being used to change a probability of decryption error in decrypting the encrypted text;

an encryption unit operable to generate the encrypted text from the plaintext, using the encryption key and the parameter stored in the storage unit, according to an encryption algorithm which changes the probability of the decryption error in decrypting the encrypted text depending on a value of the parameter; and an updating unit operable to update the parameter stored in the storage unit, wherein the decryption apparatus includes:

a decryption unit operable to generate a decrypted text from the encrypted text using a decryption key;

a decryption key updating request unit operable to request the encryption apparatus to update the decryption key; and a parameter initialization request unit operable to request the encryption apparatus to change the value of the parameter to an initial value which decreases the probability of the decryption error to a value less than or equal to a predetermined value, wherein the parameter stored in the storage unit indicates the number of terms whose coefficients indicate 1 in a random number polynomial based on an NTRU encryption method, and wherein the updating unit increases the number of the terms whose coefficients indicate 1 every passage of a predetermined amount of time.

10. The encryption system according to claim 9, wherein the encryption unit generates the encrypted text using an encryption algorithm based on the NTRU encryption method.

11. The encryption system according to claim 10, wherein the decryption key updating request unit and the parameter initialization request unit respectively send, to the encryption apparatus, a request to update the decryption key and a request to initialize the parameter, together with a request to pay a predetermined amount, and the encryption apparatus further includes:

a decryption key updating unit operable to receive, from the decryption apparatus, the request to update the decryption key, and update the decryption key in response to the updating request only when the predetermined amount is paid; and an initialization unit operable to receive the request to initialize the parameter from the decryption apparatus, and set, in response to the initialization request, the number of the terms whose coefficients indicate 1 in the random number polynomial to an initial value which decreases a probability of decryption error to a value less than or equal to a predetermined value only when the predetermined amount is paid.

12. The encryption system according to claim 9, wherein the encryption unit generates the encrypted text using the encryption algorithm based on the NTRU encryption method.

13. The encryption system according to claim 12, wherein the decryption key updating request unit and the parameter initialization request unit respectively send, to the encryption apparatus, an instruction to update the decryption key and a request to initialize the parameter, together with a request to pay a predetermined amount, and wherein the encryption apparatus further includes:

a decryption key updating unit operable to receive, from the decryption apparatus, the request to update the decryption key, and update the decryption key in response to the updating request only when the predetermined amount is paid; and an initialization unit operable to receive the request to initialize the parameter from the decryption apparatus, and set, in response to the initialization request, the number of the terms whose coefficients indicate 1 in the random number polynomial to an initial value which decreases a probability of decryption error to a value less than or equal to a predetermined value only when the predetermined amount is paid.

14. The encryption system according to claim 9, wherein the decryption apparatus further includes a judgment unit operable to judge whether or not the decrypted text is obtained correctly, the decryption key updating request unit instructs the encryption apparatus to update the decryption key, according to a result of the judgment made by the judgment unit, and the parameter initialization request unit instructs the encryption apparatus to change the value of the parameter to an initial value which decreases the probability of decryption error to a value less than or equal to a predetermined value, according to the result of the judgment made by the judgment unit.

15. An encryption method for generating an encrypted text by encrypting a plaintext, said encryption method comprising:

an encrypted text generating step of generating the encrypted text from the plaintext, using an encryption key and a parameter, according to an encryption algorithm which changes a probability of decryption error in decrypting the encrypted text depending on a value of the parameter adapted to a decryption apparatus; and an updating step of updating the parameter, wherein the parameter indicates the number of terms whose coefficients indicate 1 in a random number polynomial based on an NTRU encryption method, and wherein, in the updating step, the number of the terms whose coefficients indicate 1 is increased every passage of a predetermined amount of time.

16. The encryption method according to claim 15, wherein in the updating step, the parameter is updated so that the probability of the decryption error in decrypting the encrypted text increases with a passage of time.

17. The encryption method according to claim 15, wherein in the encrypted text generation step, the encrypted text is generated using the encryption algorithm based on the NTRU encryption method.

18. A computer-readable storage medium on which an encryption program for generating an encrypted text by encrypting a plaintext is recorded,
wherein the encryption program causes a computer to execute a method comprising:
an encrypted text generation step of generating the encrypted text from the plaintext, using an encryption key and a parameter, according to an encryption algorithm which changes a probability of decryption error in decrypting the encrypted text depending on a value of the parameter adapted to a decryption apparatus;
an updating step of updating the parameter; and
an outputting step of outputting the encrypted text,
wherein the parameter indicates the number of terms whose coefficients indicate 1 in a random number polynomial based on an NTRU encryption method, and
wherein, in the updating step, the number of the terms whose coefficients indicate 1 is increased every passage of a predetermined amount of time.

19. The encryption apparatus according to claim 1, wherein the plaintext is a content including video and audio.

20. The encryption apparatus according to claim 1, wherein the predetermined amount of time is one day.

21. The encryption system according to claim 9, wherein the plaintext is a content including video and audio.

22. The encryption system according to claim 9, wherein the predetermined amount of time is one day.

23. The encryption method according to claim 15, wherein the plaintext is a content including video and audio.

24. The encryption method according to claim 15, wherein the predetermined amount of time is one day.

25. The computer-readable storage medium according to claim 18, wherein the plaintext is a content including video and audio.

26. The computer-readable storage medium according to claim 18, wherein the predetermined amount of time is one day.

* * * * *